(12) United States Patent
Lei et al.

(10) Patent No.: US 12,309,851 B2
(45) Date of Patent: May 20, 2025

(54) TECHNIQUES FOR SELECTING RANDOM ACCESS PREAMBLES AND PAYLOAD FORMATS IN WIRELESS COMMUNICATIONS

(71) Applicant: QUALCOMM Incorporated, San Diego, CA (US)

(72) Inventors: Jing Lei, San Diego, CA (US); Seyong Park, San Diego, CA (US); Linhai He, San Diego, CA (US); Ruiming Zheng, Beijing (CN); Joseph Binamira Soriaga, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 555 days.

(21) Appl. No.: 17/598,127

(22) PCT Filed: May 1, 2020

(86) PCT No.: PCT/CN2020/088542
§ 371 (c)(1),
(2) Date: Sep. 24, 2021

(87) PCT Pub. No.: WO2020/224562
PCT Pub. Date: Nov. 12, 2020

(65) Prior Publication Data
US 2022/0191948 A1    Jun. 16, 2022

(30) Foreign Application Priority Data
May 3, 2019 (WO) ................ PCT/CN2019/085424

(51) Int. Cl.
*H04W 74/08* (2024.01)
*H04L 5/00* (2006.01)
(Continued)

(52) U.S. Cl.
CPC ....... *H04W 74/0841* (2013.01); *H04L 5/0051* (2013.01); *H04W 72/0446* (2013.01); *H04W 74/004* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 10,389,494 B2 * | 8/2019 | Choi | H04W 72/23 370/329 |
| 2014/0376466 A1 * | 12/2014 | Jeong | H04W 74/0833 370/329 |

(Continued)

FOREIGN PATENT DOCUMENTS

| | | |
|---|---|---|
| CN | 108696893 A | 10/2018 |
| WO | 2015142664 A1 | 9/2015 |

(Continued)

OTHER PUBLICATIONS

International Search Report and Written Opinion—PCT/CN2020/088542—ISA/EPO—Jul. 29, 2020.

(Continued)

*Primary Examiner* — Steve R Young
(74) *Attorney, Agent, or Firm* — ArentFox Schiff LLP

(57) ABSTRACT

Aspects described herein relate to receiving a configuration indicating multiple association rules associating random access preambles and payload formats, selecting, as part of a random access procedure, a random access preamble from the random access preambles for transmitting over a random access occasion, determining, based at least in part on at least one of the association rules in the configuration, a payload format associated with the random access preamble and a corresponding payload resource unit, and transmitting the random access preamble over the random access occasion and, according to the payload format, an associated (Continued)

payload over the corresponding payload resource unit. Multiplexing of payload resource units with same or different payload formats can be performed in time, frequency and code domains, based on the received configuration.

62 Claims, 12 Drawing Sheets

(51) Int. Cl.
*H04W 72/04* (2023.01)
*H04W 72/0446* (2023.01)
*H04W 74/00* (2009.01)
*H04W 74/0833* (2024.01)

(56) References Cited

U.S. PATENT DOCUMENTS

| | | | |
|---|---|---|---|
| 2015/0036604 A1* | 2/2015 | Park | H04L 5/0048 370/329 |
| 2018/0097591 A1 | 4/2018 | Islam et al. | |
| 2018/0124626 A1 | 5/2018 | Tsai et al. | |
| 2018/0124822 A1 | 5/2018 | Wang et al. | |
| 2019/0261424 A1* | 8/2019 | Park | H04W 74/006 370/329 |
| 2019/0313464 A1* | 10/2019 | Einhaus | H04L 5/0082 |
| 2019/0363843 A1* | 11/2019 | Gordaychik | H04W 72/044 |
| 2020/0266950 A1* | 8/2020 | Hwang | H04L 5/0048 |
| 2020/0267764 A1* | 8/2020 | Rastegardoost | H04W 72/0446 |
| 2020/0274660 A1* | 8/2020 | Xiong | H04W 72/1268 370/330 |
| 2020/0288506 A1* | 9/2020 | Lei | H04W 74/0833 370/329 |
| 2020/0314917 A1* | 10/2020 | Jeon | H04W 74/08 370/329 |
| 2020/0351801 A1* | 11/2020 | Jeon | H04W 52/48 455/522 |
| 2020/0351847 A1* | 11/2020 | Kim | H04L 5/0094 |
| 2021/0176797 A1* | 6/2021 | Kang | H04W 56/005 |
| 2021/0329704 A1* | 10/2021 | Yang | H04L 5/001 |
| 2021/0360706 A1* | 11/2021 | Cirik | H04W 74/0841 370/329 |
| 2022/0015156 A1* | 1/2022 | Xu | H04W 72/20 370/329 |
| 2022/0132595 A1* | 4/2022 | Ko | H04W 74/0841 370/329 |
| 2022/0174744 A1* | 6/2022 | Lin | H04W 74/0833 370/329 |
| 2022/0231806 A1* | 7/2022 | Hu | H04L 5/0048 370/329 |

FOREIGN PATENT DOCUMENTS

| | | |
|---|---|---|
| WO | 2018085726 A1 | 5/2018 |
| WO | 2018127042 A1 | 7/2018 |
| WO | 2018133437 A1 | 7/2018 |
| WO | 2019027995 A1 | 2/2019 |

OTHER PUBLICATIONS

International Search Report and Written Opinion—PCT/CN2019/085424—ISA/EPO—Jan. 20, 2020.
Qualcomm Incorporated: "Channel Structure for Two-Step RACH", 3GPP TSG-RAN WG1 Meeting #96Bis, R1-1904992, Channel Structurefor Two-Step RACH, 3rd Generationpartnership Project (3GPP), Mobile Competence Centre; 650, Route Deslucioles; F-06921 Sophia-Antipolis Cedex; France, vol. RAN WG1, No. Xi'an, China; Apr. 8, 2019-Apr. 12, 2019, Apr. 7, 2019 (Apr. 7, 2019), pp. 1-11.
Qualcomm Incorporated: "Procedures for Two-Step RACH", 3GPP TSG-RAN WG1 Meeting #96Bis, 3GPP Draft, R1-1904993 Procedures for Two-Step RACH, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 7, 2019 (Apr. 7, 2019), Mar. 30, 2019, XP051691916, pp. 1-12.
Spreadtrum Communications: "Considerations on the Channel Structure on 2-step RACH", 3GPP TSG RAN WG1 Meeting #96Bis, R1-1904778, V1.0, 3rd Generation Partnership Project (3GPP), Mobile Competence Centre, 650, Route Des Lucioles, F-06921 Sophia-Anti, vol. RAN WG1, No. Xian, China, Apr. 8, 2019-Apr. 15, 2019, Mar. 29, 2019, XP051691762, 5 Pages, The whole document.
Supplementary European Search Report—EP20801878—Search Authority—The Hague—Nov. 18, 2022.
ZTE: "Summary of 7.2.1.1 Channel Structure for Two-step RACH", 3GPP TSG RAN WG1 #96bis, R1-1905667, Monday Offline, 3rd Generation Partnership Project (3GPP), Mobile Competence Centre, 650, Route Des Lucioles, F-06921 So, vol. RAN WG1, No. Xian, China, Apr. 8, 2019-Apr. 12, 2019, Apr. 9, 2019, XP051707726, 36 Pages, pp. 1-5, 10.
Taiwan Search Report—TW109125090—TIPO—May 31, 2024.

* cited by examiner

TECHNIQUES FOR SELECTING RANDOM ACCESS PREAMBLES AND PAYLOAD FORMATS IN WIRELESS COMMUNICATIONS

This application is a 35 U.S.C. § 371 National Phase of International Patent Application No. PCT/CN2020/088542, entitled "TECHNIQUES FOR SELECTING RANDOM ACCESS PREAMBLES AND PAYLOAD FORMATS IN WIRELESS COMMUNICATIONS" and filed May 1, 2020, which claims priority to International Patent Application No. PCT/CN2019/085424, entitled "TECHNIQUES FOR SELECTING RANDOM ACCESS PREAMBLES AND PAYLOAD FORMATS IN WIRELESS COMMUNICATIONS" and filed May 3, 2019, which is assigned to the assignee hereof, and incorporated herein by reference in its entirety.

BACKGROUND

Aspects of the present disclosure relate generally to wireless communication systems, and more particularly, to performing random access procedures.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can use a random access procedure to establish a connection with a base station. A random access procedure can typically include four steps of messages communicated between the UE and base station to establish the connection. Recent proposals have introduced a two-step random access procedure where the UE transmits a first message including a random access preamble and a payload in a shared random access occasion, and the base station receiving the first message can transmit a second message including a random access response (e.g., to the random access preamble) and/or contention resolution information. The first message from the UE can include two separate transmissions (e.g., in time) of the preamble and payload portions of the message, and the gap between the preamble transmission and the payload transmission can be configurable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes receiving a configuration indicating multiple association rules associating random access preambles and payload formats, selecting, as part of a random access procedure, a random access preamble from the random access preambles for transmitting over a random access occasion, determining, based at least in part on at least one of the association rules in the configuration, a payload format associated with the random access preamble and a corresponding payload resource unit, and transmitting the random access preamble over the random access occasion and, according to the payload format, an associated payload over the corresponding payload resource unit.

In another aspect, a method for wireless communications is provided. The method includes receiving a configuration indicating multiple association rules associating random access preambles and payload formats, receiving, over a random access occasion, a random access preamble, selected from the random access preambles, and, over a corresponding payload resource unit, an associated payload, determining, based at least in part on the configuration and the random access preamble, at least one of a payload format or the corresponding payload resource unit for the associated payload, and processing the associated payload based on at least one of the payload format or the corresponding payload resource unit for the associated payload.

In another aspect, an apparatus for wireless communication is provided that includes a transceiver, a memory configured to store instructions, and one or more processors coupled (e.g., communicatively, operatively, electronically, or otherwise) with the transceiver and the memory. The instructions are executable by the one or more processors to cause the apparatus to receive a configuration indicating multiple association rules associating random access preambles and PUSCH occasion formats, select, as part of a random access procedure, a random access preamble from the random access preambles for transmitting over a random access occasion, determine, based at least in part on at least one of the association rules in the configuration, a PUSCH occasion format associated with the random access preamble and a corresponding payload resource unit, and transmit the random access preamble over the random access occasion and, according to the PUSCH occasion format, an associated payload over the corresponding payload resource unit.

In another aspect, an apparatus for wireless communication is provided that includes a transceiver, a memory configured to store instructions, and one or more processors coupled (e.g., communicatively, operatively, electronically, or otherwise) with the transceiver and the memory. The instructions are executable by the one or more processors to cause the apparatus to receive a configuration indicating multiple association rules associating random access preambles and PUSCH occasion formats, receive, over a random access occasion, a random access preamble, selected from the random access preambles, and, over a corresponding payload resource unit, an associated payload determine, based at least in part on at least one of the association rules in the configuration and the random access preamble, a PUSCH occasion format associated with the random access preamble and the corresponding payload resource unit, and process the associated payload based on at least one of the PUSCH occasion format or the corresponding payload resource unit for the associated payload.

In another aspect, an apparatus for wireless communication is provided that includes means for receiving a configuration indicating multiple association rules associating random access preambles and PUSCH occasion formats, means for selecting, as part of a random access procedure, a random access preamble from the random access preambles for transmitting over a random access occasion, means for determining, based at least in part on at least one of the association rules in the configuration, a PUSCH occasion format associated with the random access preamble and a corresponding payload resource unit, and means for transmitting the random access preamble over the random access occasion and, according to the PUSCH occasion format, an associated payload over the corresponding payload resource unit.

In another aspect, an apparatus for wireless communication is provided that includes means for receiving a configuration indicating multiple association rules associating random access preambles and PUSCH occasion formats, means for receiving, over a random access occasion, a random access preamble, selected from the random access preambles, and, over a corresponding payload resource unit, an associated payload, means for determining, based at least in part on at least one of the association rules in the configuration and the random access preamble, a PUSCH occasion format associated with the random access preamble and the corresponding payload resource unit, and means for processing the associated payload based on at least one of the PUSCH occasion format or the corresponding payload resource unit for the associated payload.

In another aspect, a computer-readable medium including code executable by one or more processors for wireless communications is provided. The code includes code for receiving a configuration indicating multiple association rules associating random access preambles and PUSCH occasion formats, selecting, as part of a random access procedure, a random access preamble from the random access preambles for transmitting over a random access occasion, determining, based at least in part on at least one of the association rules in the configuration, a PUSCH occasion format associated with the random access preamble and a corresponding payload resource unit, and transmitting the random access preamble over the random access occasion and, according to the PUSCH occasion format, an associated payload over the corresponding payload resource unit.

In another aspect, a computer-readable medium including code executable by one or more processors for wireless communications is provided. The code includes code for receiving a configuration indicating multiple association rules associating random access preambles and PUSCH occasion formats, receiving, over a random access occasion, a random access preamble, selected from the random access preambles, and, over a corresponding payload resource unit, an associated payload, determining, based at least in part on at least one of the association rules in the configuration and the random access preamble, a PUSCH occasion format associated with the random access preamble and the corresponding payload resource unit, and processing the associated payload based on at least one of the PUSCH occasion format or the corresponding payload resource unit for the associated payload.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
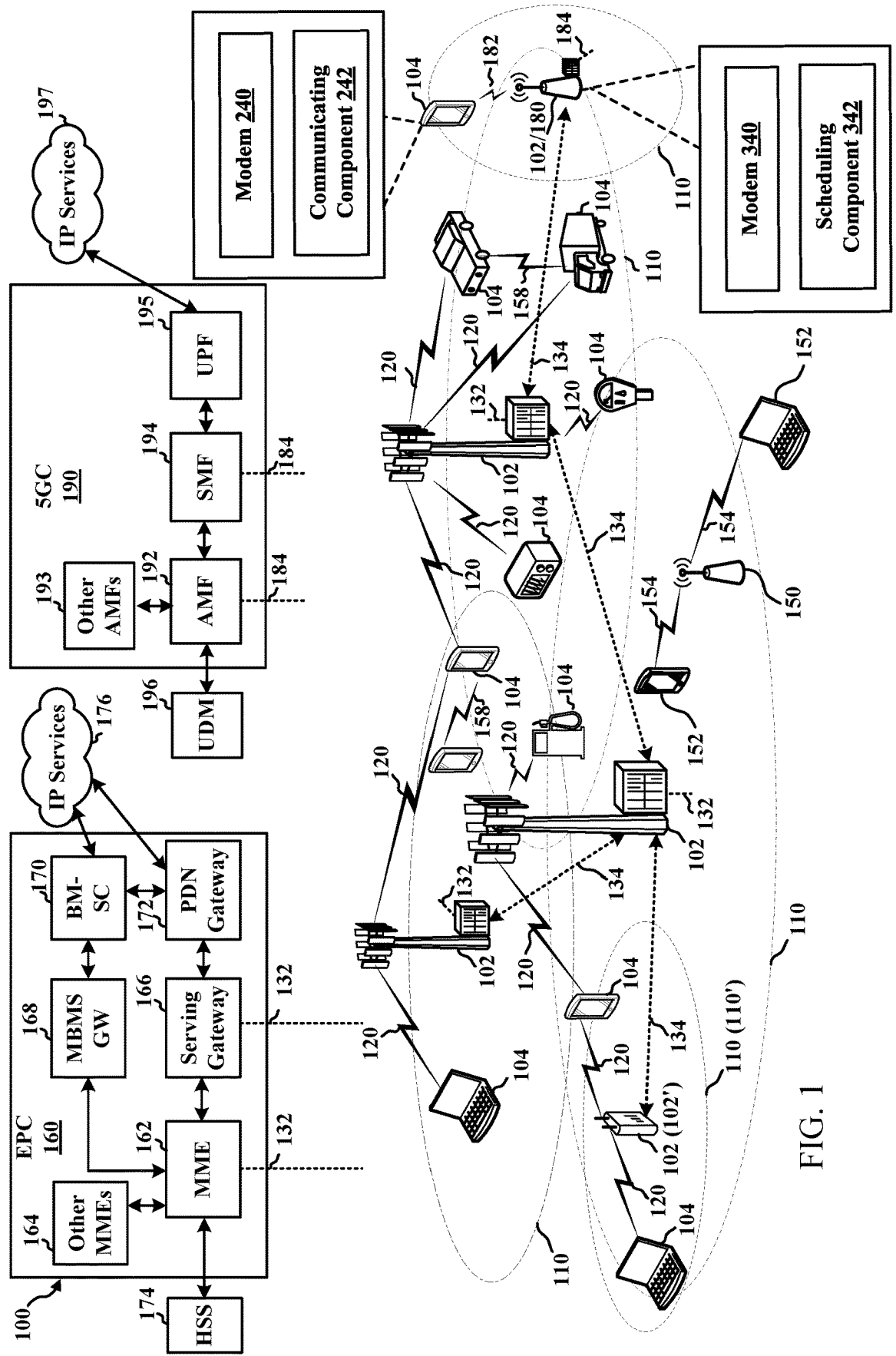
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects.

It may be evident, however, that such aspect(s) may be practiced without these specific details.

The described features generally relate to selecting random access preambles and associated payload formats for transmitting a first message in a two-step random access procedure. In two-step random access procedures, a base station can broadcast signals with parameters for establishing a connection with the base station. Such signals may include one or more synchronization signal blocks (SSBs), system information blocks (SIBs), reference signals (RSs), and/or the like. A user equipment (UE) can receive the broadcast signals and can synchronize with the downlink from the base station, perform system information decoding and measurement, and/or the like. In addition, the UE can determine, based on parameters in the broadcast signals, one or more random access occasions for transmitting random access messages to establish a connection with the base station. When the UE desires to establish a connection with the base station, the UE can transmit a first message of the two-step random access procedure, which may include a preamble portion and a payload portion (e.g., where the payload portion can include physical uplink shared channel (PUSCH) data), and these portions may be transmitted as separated by a transmission gap in time. The base station can receive the first message (e.g., as the preamble and payload portions) and can transmit a response message to the UE, where the response message can include a random access response and/or contention resolution information.

Aspects described herein relate to selecting a random access preamble from multiple possible random access preambles and determining an associated payload occasion (PO), which may include a payload format, and/or payload resource unit (PRU) for transmitting the first message of the two-step random access procedure. Various random access preambles and associated POs and/or PRUs can be defined in a configuration, which can be at least one of communicated from a network (e.g., a base station) to a user equipment (UE) desiring to access the network, stored in memory of the base station and/or UE, and/or the like, such that the UE can determine a PO and/or PRU associated with a selected random access preamble.

For example, a PO (which can also more specifically refer to a physical shared uplink channel (PUSCH) occasion) may be defined by time and/or frequency resources allocated for a payload transmission (e.g., a PUSCH transmission) as part of at least a payload portion of a first message in a two-step random access procedure, as described herein. In an example, the PO can support asynchronous uplink transmission in the two-step random access procedure, and/or guard time (GT) and/or guard band (GB) can be configured for each PO to mitigate inter-symbol interference (ISI) and/or inter-carrier interference (ICI). In addition, for example, a PRU (which can also more specifically refer to a PUSCH resource unit) may be defined as a PO and a corresponding demodulation reference signal (DMRS) port and/or sequence used to transmit the payload as part of transmitting at least the payload portion of the first message in the two-step random access procedure. In an example, the contents and/or payload sizes of the payload may depend on use cases, link qualities, etc. For example, for radio resource control (RRC) idle or inactive state, a payload size can be large enough for a unique UE identifier, RRC requests, and/or small data. For RRC connected state, the payload size can be larger (e.g., large enough for a media access control (MAC) control element (CE) and/or user-plane (UP)/control plane (CP) data). Multiple PO formats can be supported to accommodate different use cases, coverage requirements, etc. The bursty traffic pattern of the first message (also referred to as "msgA") in the two-step random access procedure may make fixed resource allocation inefficient for a given payload size.

In one example, random access preambles and associated PO formats and/or corresponding PRUs can be grouped into sets to allow for multiplexing transmission of the preambles and/or payloads from multiple UEs. In any case, in an example, the UE can determine the PO format and/or PRU for the selected random access preamble and/or can determine which random access preamble to select (and/or a group of random access preambles from which to select) based on a desired PO format (e.g., or corresponding payload size).

The described features will be presented in more detail below with reference to FIGS. 1-12.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for generating and transmitting random access messages in a random access procedure. In addition, some nodes may have a modem 340 and scheduling component 342 for scheduling or otherwise enabling usage of resources for transmitting random access messages, transmitting response messages to the random access messages, etc., as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can broadcast information related to transmitting random access messages, and communicating component 242 can process the broadcast information and accordingly transmit a random access message during a random access occasion (RO). An RO may include, e.g., time and frequency resources allocated for msgA transmission, and multiple two-step RACH UEs may share the same RO in transmitting respective msgA preambles (e.g., different UEs may select different preamble sequences (e.g., in code domain multiplexing)). For example, communicating component 242 can select one of multiple random access preambles, determine a PO format, PRU, and/or other PO parameters for transmitting a payload associated with the selected random access preamble, etc., and can transmit the random access preamble in a corresponding random access occasion and the payload in a corresponding PO according to the format. Scheduling component 342 can receive and process the random access preamble and payload as a first message in a two-step random access request, as described further herein. In addition, communicating component 242 can select the random access preamble and/or corresponding payload format based on a configuration, which may be received from scheduling component 342, stored in a memory of the UE 104, and/or the like. The configuration may indicate multiple association rules associating random access preambles and PO formats (and/or PRUs) to allow multiplexing of payloads from different UEs, as described further herein.

Figure 2:
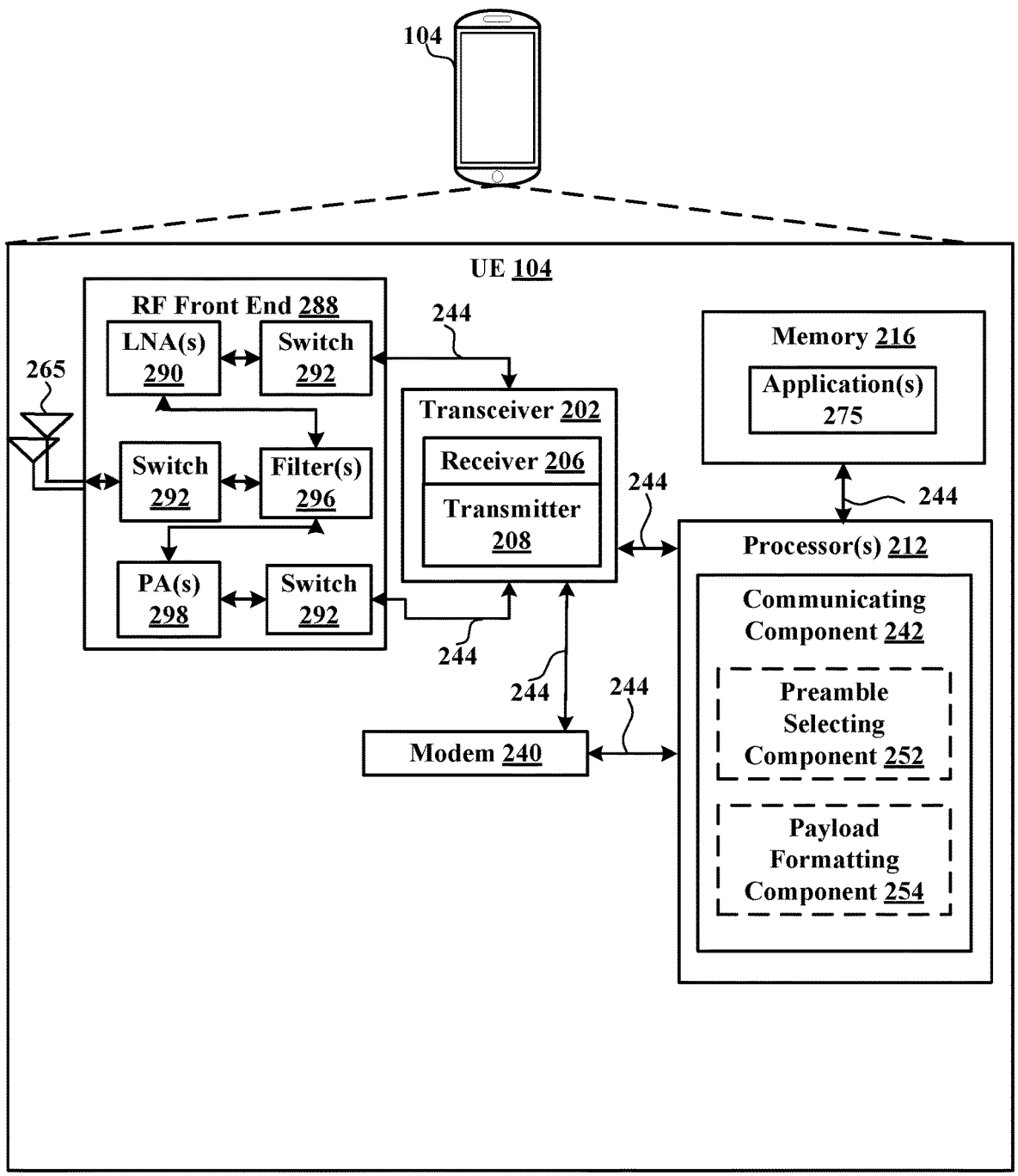
FIG. 2 is a block diagram illustrating an example of a UE, in accordance with various aspects of the present disclosure.
Figure 3:
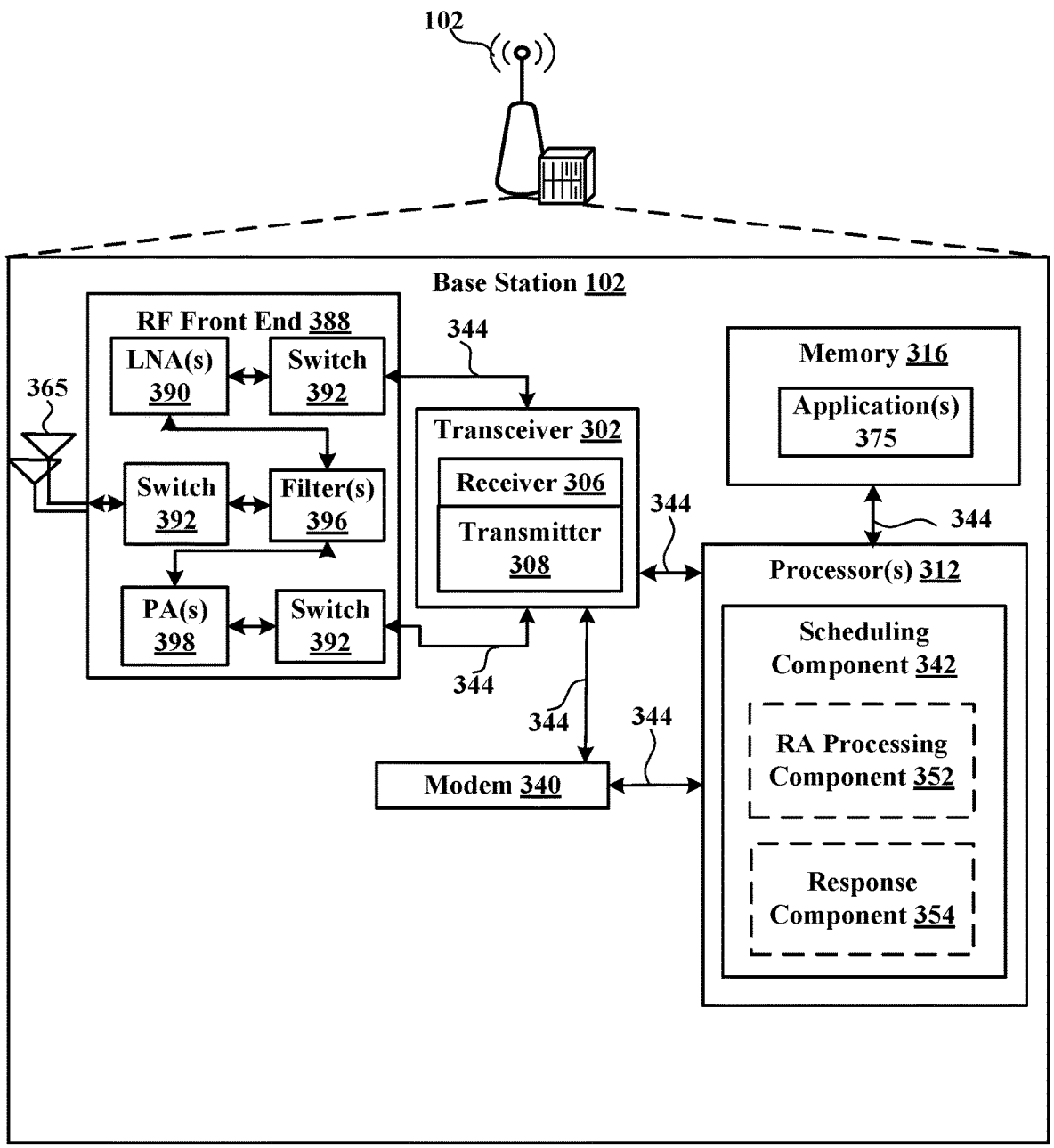
FIG. 3 is a block diagram illustrating an example of a base station, in accordance with various aspects of the present disclosure.
Figure 4:
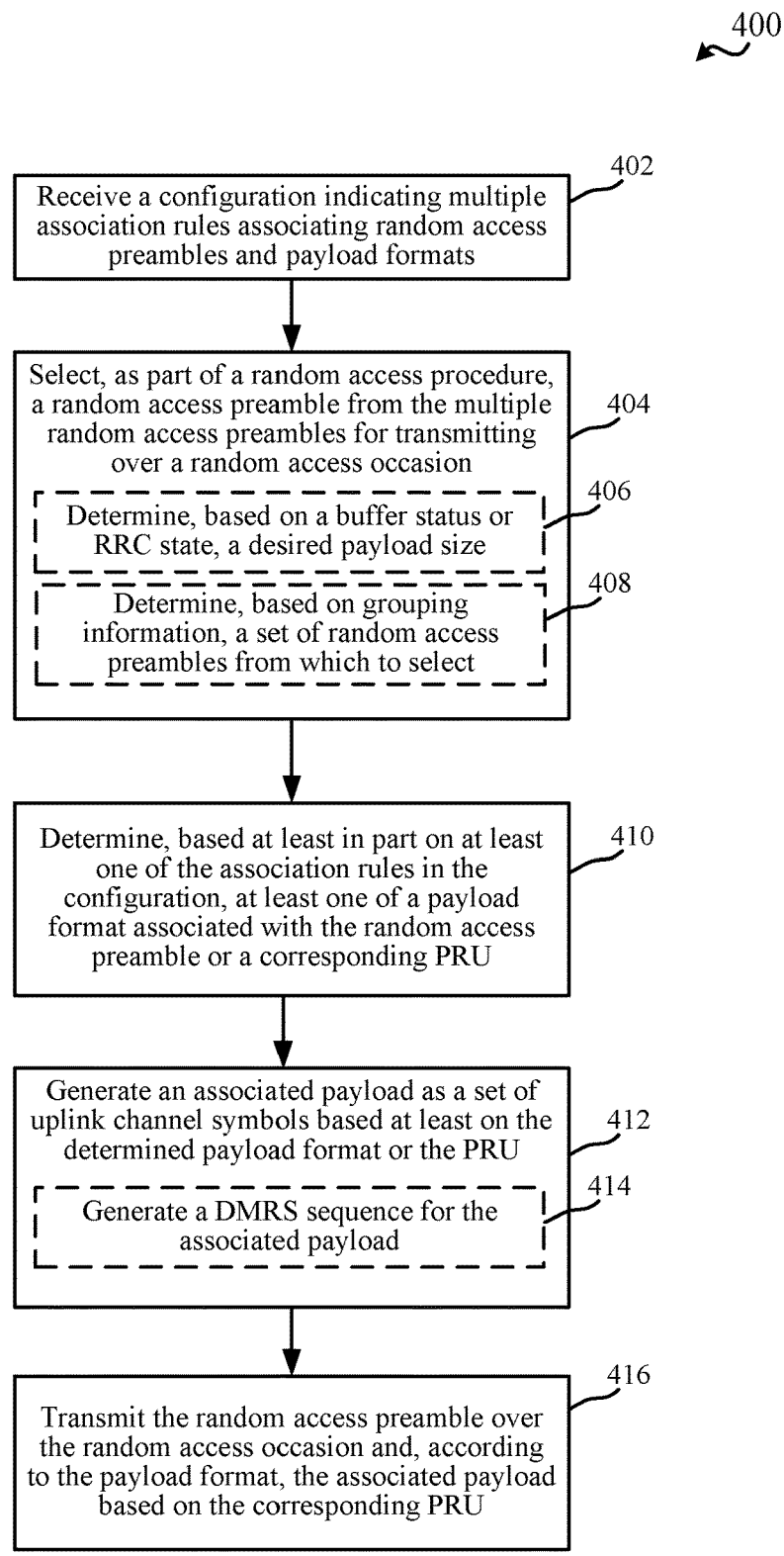
FIG. 4 is a flow chart illustrating an example of a method for transmitting random access messages, in accordance with various aspects of the present disclosure.
Figure 5:
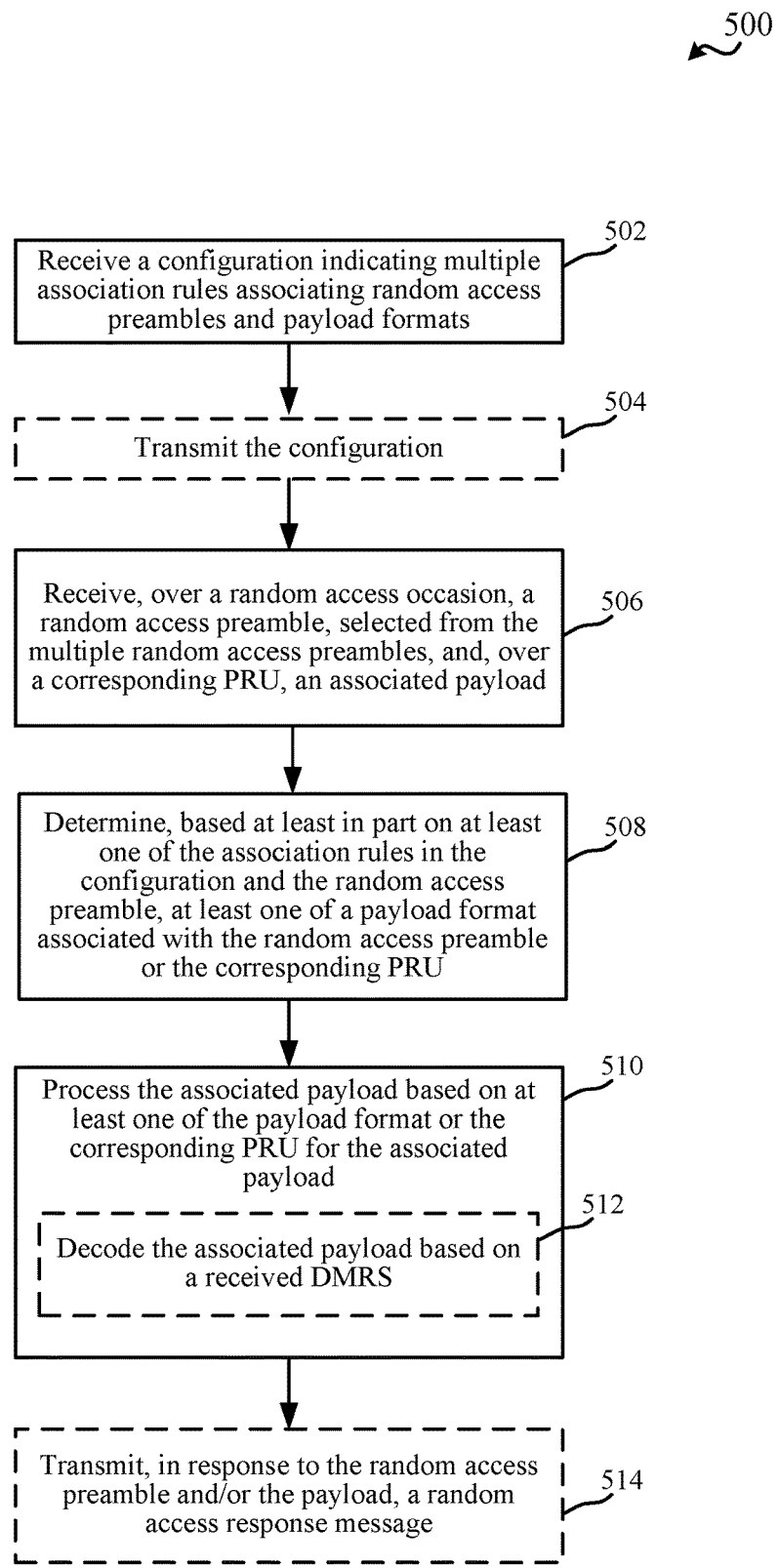
FIG. 5 is a flow chart illustrating an example of a method for receiving random access messages, in accordance with various aspects of the present disclosure.

Turning now to FIGS. 2-12, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting random access messages.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a preamble selecting component 252 for selecting a random access preamble for transmitting in a first message of a two-step random access procedure, and/or a payload formatting component 254 for formatting, based on a payload format, PO, PRU, etc. determined as associated with the selected random access preamble, a payload to be transmitted in the first message of the two-step random access procedure.

In an aspect, the processor(s) 212 may correspond to one or more of the processors described in connection with the UE in FIG. 12. Similarly, the memory 216 may correspond to the memory described in connection with the UE in FIG. 12.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling or otherwise enabling usage of resources for transmitting random access messages, transmitting response messages to the random access messages, etc.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a RA processing component 352 for receiving and processing a first message in a random access procedure from a UE 104, which may include a random access preamble and/or an associated payload, and/or a response component 354 to generate a response message for the random access message.

In an aspect, the processor(s) 312 may correspond to one or more of the processors described in connection with the base station in FIG. 12. Similarly, the memory 316 may correspond to the memory described in connection with the base station in FIG. 12.

FIG. 4 illustrates a flow chart of an example of a method 400 for transmitting a random access message. In an example, a UE 104 can perform the functions described in method 400 using one or more of the components described in FIGS. 1 and 2. FIG. 5 illustrates a flow chart of an example of a method 500 for receiving a random access message, and is described in conjunction with method 400 for ease of explanation, though the methods 400 and 500 are not required to be performed in conjunction. In one example, a UE 104 can perform the functions described in method 400 using one or more of the components described in FIGS. 1 and 2, and a base station 102 can perform the functions described in method 500 using one or more of the components described in FIGS. 1 and 3.

In method 400, at Block 402, a configuration indicating multiple association rules associating random access preambles and payload formats can be received. In an aspect, communicating component 242, e.g., in conjunction with processor(s) 212, memory 216, transceiver 202, etc., can receive a configuration indicating multiple association rules associating random access preambles and payload formats (also referred to herein as PO format or PUSCH occasion format). For example, communicating component 242 can receive at least a portion of the configuration from memory 216 (e.g., where the configuration can be hardcoded in the memory 216 or other storage module accessible within the UE 104, via bus 244, etc.). In an additional or alternative example, communicating component 242 can receive at least a portion the configuration from a base station 102 or other network device, such as in broadcast signaling from the base station (e.g., system information (SI) signaling), in RRC signaling, in dedicated control signaling for the UE 104, and/or the like. In one example, communicating component 242 can receive at least a first portion of the configuration from memory 216 and at least a second portion of the configuration from RRC or other signaling.

In one example, the configuration can specify a finite set of payload sizes for different use cases of two-step random access procedure. In another example, the configuration may additionally or alternatively specify a finite set of payload formats (also referred to as PO formats), which may be defined by one or more parameters such as number of symbols or slots per PO, number of physical resource blocks (PRBs) per PO, numerology of an uplink channel to be transmitted in the PO (e.g., physical uplink shared channel (PUSCH), which may include subcarrier spacing (SCS), cyclic prefix types (e.g., normal CP (NCP), extended CP (ECP), etc.), transport block size (which can be similar to or different from the payload size after rate matching), modulation and coding scheme (MCS), preamble formats for the random access preamble portion of the random access message (which may include a down selection of physical random access channel (PRACH) preamble formats that are capable of achieving similar coverage as the payload with the given MCS under a maximum transmit power limit), waveform of PUSCH (e.g., cyclic prefix orthogonal frequency division multiplexing (CP-OFDM) or discrete Fourier transform spread orthogonal frequency division multiplexing (DFT-s-OFDM)), and/or the like. In one example, the one or more parameters may be respective to the random access preamble and/or an associated GT or GB thereafter. In an example, the various payload formats and associated parameters can be described by a look up table (LUT) specified by the configuration. The LUT may have a format similar to the following.

| PO Format Index | Number of Symbols/ slots per PO | Number of PRBs per PO | Number of Slots or OFDM symbols used for PUSCH | TBS | MCS | Preamble Formats | PUSCH waveform |
|---|---|---|---|---|---|---|---|
| {0, 1, . . .} | Positive integer defined on a finite set | Positive integer defined on a finite set | SCS and CP types | Positive integer defined on a finite set | Linear mod scheme and channel coding rate | Index of PRACH preamble formats | CP-OFDM or DFT-s-OFDM |

15

In another example, the PO format specification can also account for the rate matching impacts resulted from transmitting uplink control information (UCI) along with the PUSCH payload. In addition, the configuration can be cell specific, specific for a given bandwidth (e.g., bandwidth part (BWP)), etc.

In this or other examples, RO and PO for two-step random access procedure can be mapped to configured time-frequency resources (e.g., to a PRU or related resources). The mapping may be indicated in the configuration or otherwise. In one example, the configuration may include an indication of resources (e.g., time and/or frequency resources) allocated for each PO format. For example, the configuration may include an indication of a starting location (e.g., in time and/or frequency) and/or an ending location (e.g., in time and/or frequency) for the PO format. For example, the starting location and/or ending location can correspond to a location of frequency (e.g., one or more subcarriers in a frequency band, channel number or other identifier of a frequency location, span of frequency, etc.). The starting location and/or ending location additionally or alternatively can correspond to a location of time (e.g., an index of a symbol, such as an orthogonal frequency division multiplexing (OFDM) symbol, single carrier frequency division multiplexing (SC-FDM) symbol, etc., a collection of symbols, a slot including multiple symbols, a subframe including multiple slots, etc.), and/or the like. In one example, the starting location and/or ending location can correspond to a location of time and frequency, such as one or more resource blocks (RBs) and may be indicated by one or more RB indices, an RB offset from a first RB, a span of RB indices or a size of multiple consecutive RBs, etc. In one example, as described, the indication may include an explicit indication of resources, or one or more values from which the resource location can be derived (e.g., respective to a preamble transmission or otherwise), etc. The configured resources can be used to define a multiplexing scheme, as described further herein.

In one example, on a given RO, preamble sequences can be partitioned into multiple groups, where each group can be associated with a particular PO format. As described further herein, the resources for the payload corresponding to preamble sequences (e.g., within the same group and/or in different groups) can be specified to facilitate multiplexing transmission of the payloads by different UEs. In an example, communicating component 242 can derive the resource allocation information for RO and PO, as well as association rules between preamble sequences and PO format. In one example, communicating component 242 can derive the information from the configuration and/or other information, one or more of which may be received based (at least) on SI broadcast by the base station, formulas and/or look up tables indicated in a specification and/or stored in memory 216, RRC signaling (for UE in RRC Connected state), etc. In an example, each PO can have a corresponding indication of resources, such as a starting frequency, a starting symbol in a slot, a number of symbols per PO, a number of time domain POs, an offset of symbols or frequency related to PRACH communications (e.g., an offset of symbol or slot from a RO or PRACH slot), etc.

In method 400, at Block 404, a random access preamble can be selected, as part of a random access procedure, from the multiple random access preamble for transmitting over a random access occasion. In an aspect, preamble selecting component 252, e.g., in conjunction with processor(s) 212, memory 216, transceiver 202, communicating component 242, etc., can select, as part of the random access procedure, the random access preamble from the multiple random access preambles for transmitting over the random access occasion. In one example, preamble selecting component 252 can select a random access preamble based on determining a desired payload size, format, or occasion, based on determining grouping information related to the random access preambles and/or associated payload size, format, or occasion, etc.

In selecting the random access preamble at Block 404, optionally at Block 406, a desired payload size can be determined based on a buffer status or RRC state. In an aspect, preamble selecting component 252, e.g., in conjunction with processor(s) 212, memory 216, transceiver 202, communicating component 242, etc., can determine, based on the buffer status or RRC state (or other parameters), the desired payload size. Based on the desired payload size, for example, preamble selecting component 252 can select a preamble with an associated PO having the desired payload size. As described, a UE may desired a larger payload size for certain RRC states (e.g., RRC connected) than others (e.g., RRC idle or inactive), or as a function of a buffer status (e.g., a buffer status report or other indicator of buffer capacity or amount of data stored in the buffer for transmission as a payload portion of the first message in the random access procedure).

In another example, in selecting the random access preamble at Block 404, optionally at Block 408, a set of random access preambles from which to select can be determined based on grouping information. In an aspect, preamble selecting component 252, e.g., in conjunction with processor(s) 212, memory 216, transceiver 202, communicating component 242, etc., can determine, based on the grouping information, the set of random access preambles from which to select, and can select the random access preamble from the set. In an example, preamble selecting component 252 can receive the grouping information as part of the configuration, and the grouping information may specify multiple groups of random access preambles, where each group can correspond to a PO format. Each random access preamble in the group may be associated with a PRU for the PO format to facilitate multiplexing payload transmission, as described further herein.

Figure 6:
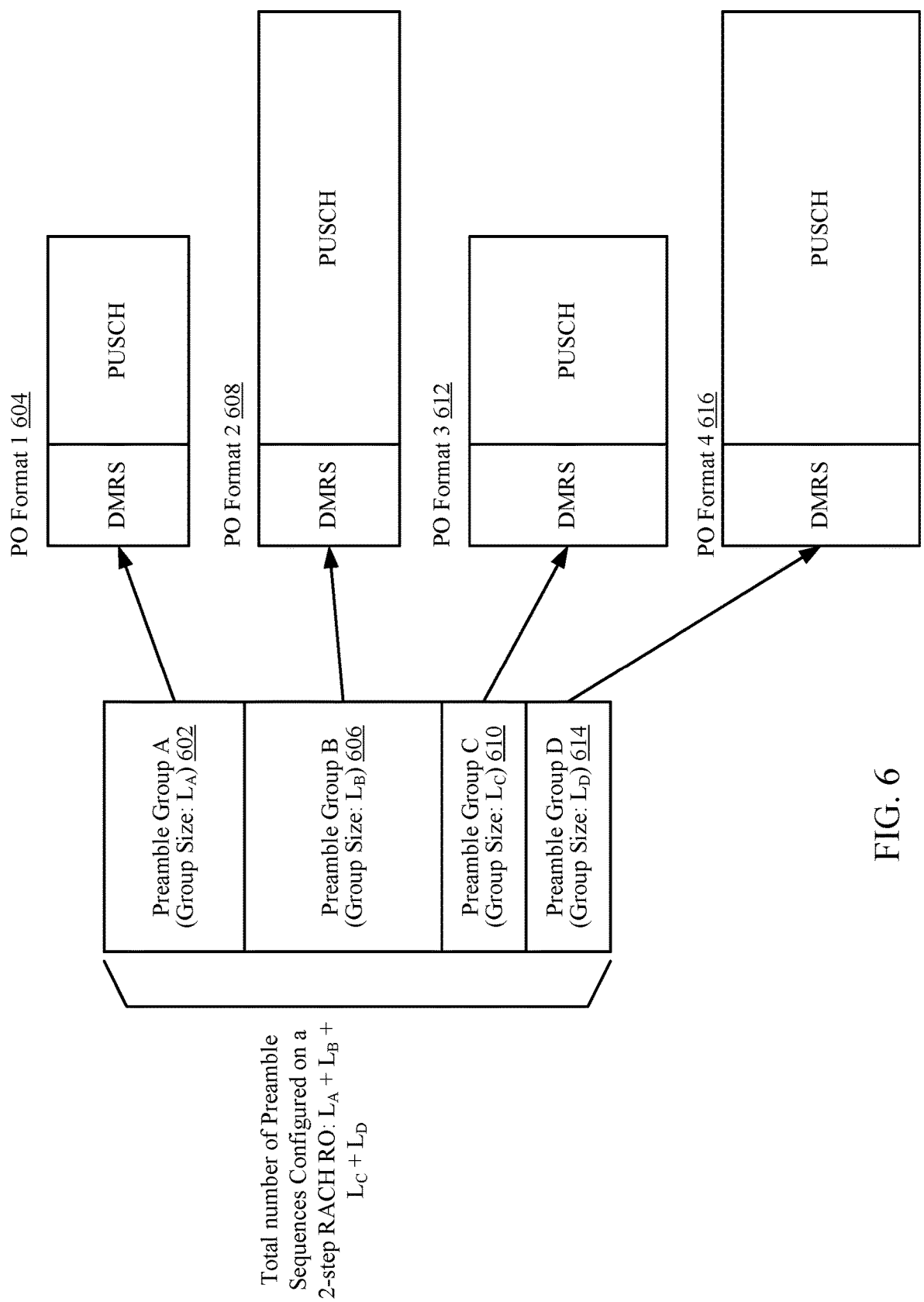
FIG. 6 illustrates an example of groupings of random access preambles, in accordance with various aspects of the present disclosure.

An example is shown in FIG. 6, which illustrates an example of multiple preamble groups of varying sizes. Each preamble group is associated with a different PO format, which can also have a different number of time and/or frequency resources. For example, the configured preamble groups can include preamble group A 602 of size $L_A$, which corresponds to PO format 1 604, preamble group B 606 of size $L_B$, which corresponds to PO format 2 608, preamble group C 610 of size $L_C$, which corresponds to PO format 3 612, and preamble group D 614 of size $L_D$, which corresponds to PO format 4 616. Each of the preamble groups 602, 606, 610, 614 can include a respective number of preambles and/or resources corresponding to random access occasions, etc. In addition, for example, each PO format 604, 608, 612, 616 can include a respective number of resources for at least a PUSCH portion (e.g., a number of frequency resources, time resources, RBs, etc. that can be used to transmit the payload according to the PO format). In an example, these various preamble groups, related resources, corresponding PO formats and/or resources, etc. can be indicated in the configuration received from memory, in RRC or other signaling, etc., as described above.

In method 400, at Block 410, at least one of a payload format associated with the random access preamble or a corresponding PRU can be determined based at least in part on at least one of the association rules in the configuration. In an aspect, payload formatting component 254, e.g., in conjunction with processor(s) 212, memory 216, transceiver 202, communicating component 242, etc., can determine, based at least in part on at least one of the association rules in the configuration, at least one of the payload format associated with the selected random access preamble or the corresponding PRU. For example, payload formatting component 254 can determine the payload format, occasion, and/or other corresponding parameters of the PRU based on the selected preamble (e.g., by determining the associated format and/or parameters in the LUT, as described).

In an example, based on the configuration information and association rules derived (e.g., as well as based on a buffer status and/or RRC state, etc.), preamble selecting component 252 can generate a msgA preamble and payload by selecting a preamble sequence within a given set (e.g., based on the grouping information), and identifying a PO format (e.g., from the LUT associating preamble sequences with PO formats and/or PRUs, as described above). For example, preamble selecting component 252 can select the preamble sequence based on the PO format or size such to select a preamble sequence corresponding to a PO format sufficient to send data a buffer (e.g., based on BSR) and/or based on the RRC state (e.g., select a preamble sequence for a larger PO format for RRC connected than for RRC idle, etc.).

In method 400, at Block 412, an associated payload can be generated as a set of uplink channel symbols based at least on the determined payload format or the PRU. In an aspect, payload formatting component 254, e.g., in conjunction with processor(s) 212, memory 216, transceiver 202, communicating component 242, etc., can generate the associated payload as the set of uplink channel symbols based at least on the determined payload format or the PRU. For example, payload formatting component 254 can generate the associated payload as the set of uplink channel (e.g., PUSCH) symbols based on parameters in the LUT, such as number of PRBs, TBS, MCS, waveform, etc., or other parameters of the PRU, as described above.

In generating the associated at Block 412, optionally at Block 414, a DMRS sequence can be generated for the associated payload. In an aspect, payload formatting component 254, e.g., in conjunction with processor(s) 212, memory 216, transceiver 202, communicating component 242, etc., can generate the DMRS sequence for the associated payload. In this example, payload formatting component 254 can generate the DMRS sequence to be transmitted from a chosen antenna port, based at least on the one or more of a frame number, subframe number, slot number, etc. related to transmitting the payload, cell identifier, PO format, preamble sequence index, RO index, etc., and can concatenate the DMRS and PUSCH symbols for transmission.

In method 400, at Block 416, the random access preamble can be transmitted over the random access occasion and the associated payload can be transmitted, according to the payload format, based on the corresponding PRU. In an aspect, communicating component 242, e.g., in conjunction with processor(s) 212, memory 216, transceiver 202, etc., can transmit the selected random access preamble over the random access occasion, and, according to the payload format, the associated payload based on the corresponding PRU. For example, communicating component 242 can transmit the associated payload as the concatenated DMRS and PUSCH symbols, which may be mapped to a PO and DMRS port/sequence defined for the selected random access preamble. In one example, communicating component 242 can transmit the random access preamble and/or the associated payload as multiplexed (e.g., in time, frequency, code, and/or the like) with other UEs transmitting a random access preamble and associated payloads, as described further herein.

In one example, generating and/or transmitting the payload can be based on a PO format selected by UE, which specifies the TBS, the time-frequency resources, the MCS, and the waveform, etc. associated with the PRU. PRU of different PO formats can be multiplexed (e.g., in time, frequency, and/or code domains) to improve the resource utilization efficiency, which can be fully or partially overlapping in time and/or frequency resources configured for payload transmission. For example, this can be based on an indication of the starting and/or ending locations of a PRU resource within the aggregated PRU resources allocated for multiple PO formats. As described, in an example, the configuration may indicate POs and associated parameters, which may specify size, location, waveform and transport format of resources for transmitting the payload. The parameters specifying the resources may be jointly configured with respect to the corresponding preamble format. For example, a number of PRBs can be defined for the PO (e.g., in the configuration, such as in the LUT of POs), which may be respective to resources identified for transmitting the selected preamble. In this example, communicating component 242 can determine resources for transmitting the payload to include the number of PRBs within a similar frequency span as that used for the preamble and to be transmitted after a configured GT, transmission gap (TxG), etc. from the preamble.

Figure 7:
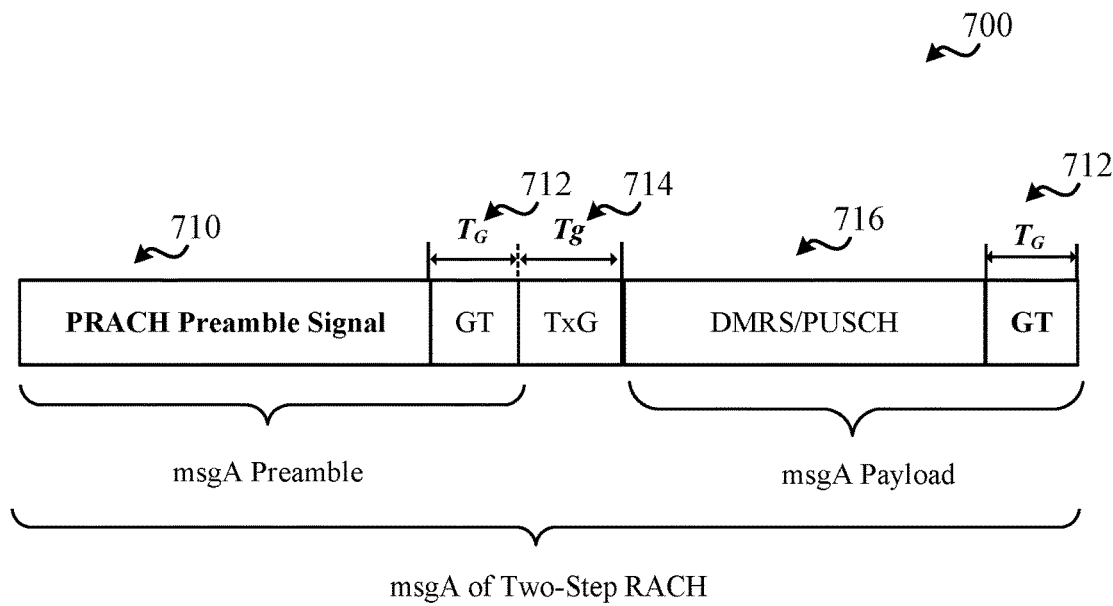
FIG. 7 illustrates examples of first message format and encoding for a two-step random access procedure, in accordance with various aspects of the present disclosure.
Figure 7:
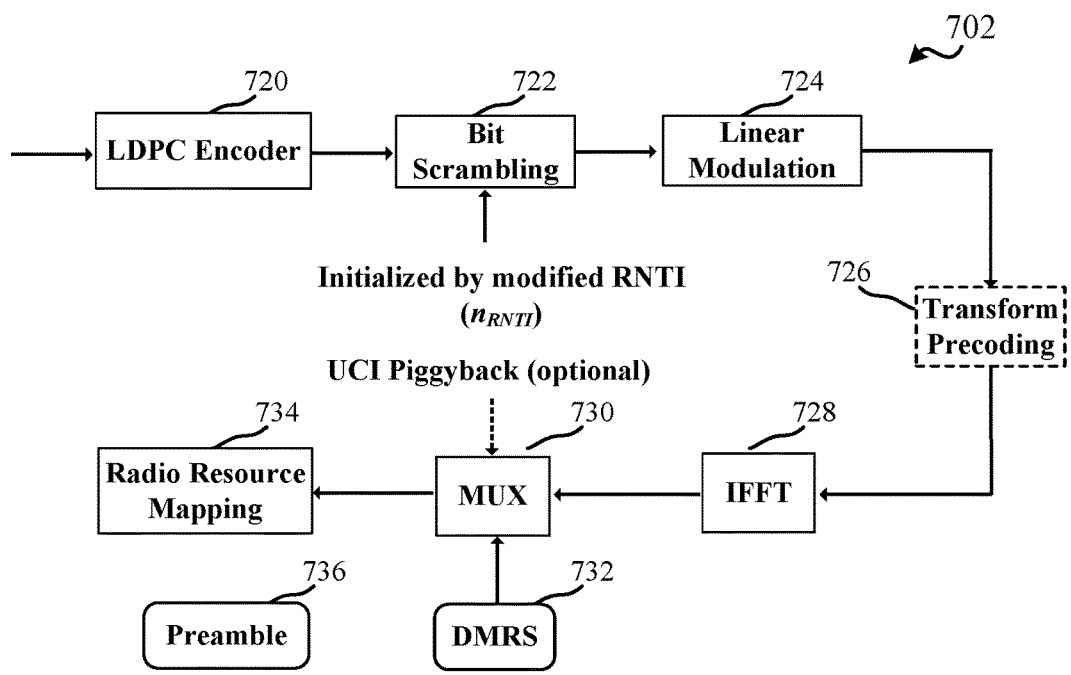

An example is shown in FIG. 7, which illustrates an example of a channel structure for a first message (msgA) 700 transmitted in a two-step random access procedure with a configurable TxG. The first message 700 includes a preamble portion 710 followed by a GT 712, TxG 714, and then the payload (DMRS/PUSCH) 716 followed by another GT 712. The GT 712 and/or TxG 714 may be separately configured by the network (and/or may be further specified/modified in the configuration or LUT described herein for specific preambles). In any case, in an example, communicating component 242 can determine resources of the PO respective to the preamble or corresponding RO, as described.

In an example, the format of the first message 700 can allow for supporting contention-based random access on shared time/frequency/code resources, can allow transmission bandwidth for preamble and payload to be different, etc. In addition, payload size for different use cases and RRC states can be configurable, as described herein. For example, msgA content may have a minimum payload size 56/72 bits and there may be no defined upper bound on payload size. Some studies have used 1000 bits small data from UP/CP. Preamble portion of msgA may serve multiple purposes, such as facilitating timing offset estimation by gNB, and early indication of MCS, payload size and resource allocation for payload. This early indication may allow for simplified solution than UCI piggyback on PUSCH, for both UE and gNB, and may be based on pre-defined or otherwise configured mapping rule between preamble and payload.

FIG. 7 also illustrates an example of a transmit chain 702 of msgA for a two-step RACH. Transmit chain 702 includes a low-density parity-check (LDPC) encoder 720, bit scrambling process 722 (which can be initialized by a modified radio network temporary identifier (RNTI), nRNTI below, a linear modulation process 724, optional transform precoding 726, inverse fast Fourier transform (IFFT) 728, multiplexer (MUX) 730, which can include a DMRS 732 and/or UCI piggyback input, and a radio resource mapping process 734, which can include a preamble input 736. For example, this can be used in one or more components of the transceiver 202, RF front end 288, etc. of a UE 104 to generate and/or transmit uplink symbols defining the preamble and/or payload. A unified bit scrambling scheme can be used for one or more (or all) RRC states, which can be defined as:

$$n_{RNTI} \triangleq [RA\text{-}RNTI + K1 \times p\_id + K2 \times r\_id]_{16}$$

Where p_id and r_id denote the index of preamble and DMRS, $K_1$ and $K_2$ are constants for scaling, and $c_{init} = n_{RNTI} 2^{15} + n_{ID}$.

Figure 8:
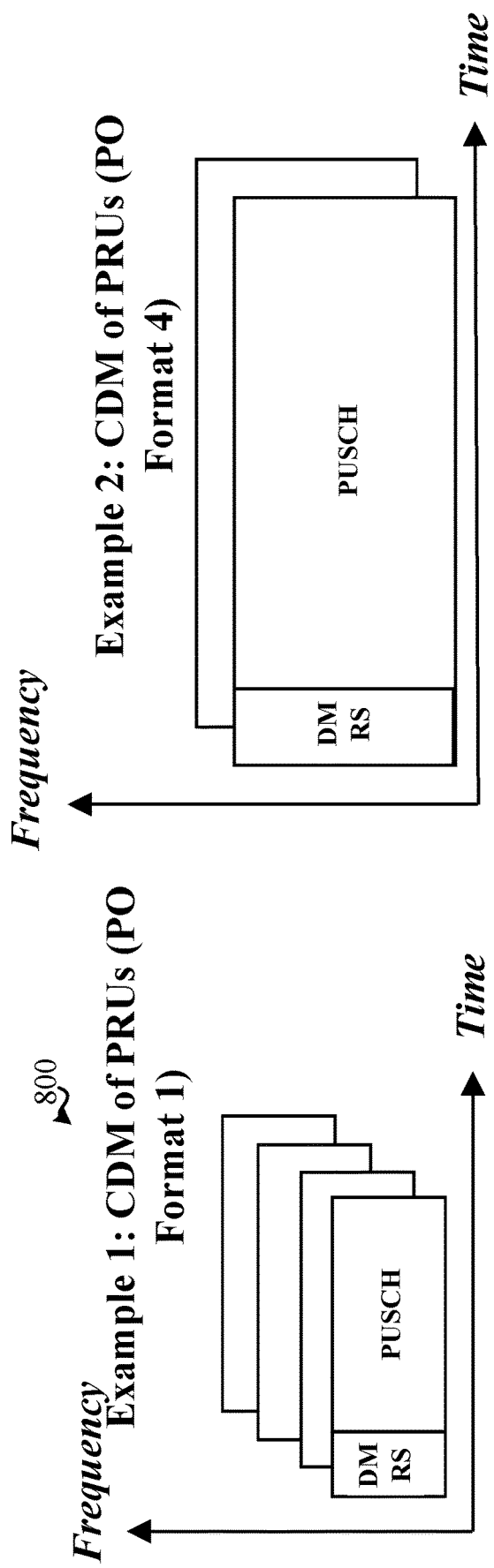
FIG. 8 illustrates examples of code division multiplexed random access message payloads, in accordance with various aspects of the present disclosure.

For example, the payload formats can be defined in a configuration to facilitate such multiplexing. In an example, multiple random access preambles can be defined for a given PO format, as described, and/or the configuration can indicate PO format information, PO resources, etc., so that selected random access preambles and/or payloads transmitted based on the same PO format can be multiplexed in a code domain. An example is shown in FIG. 8, which depicts examples of code division multiplexed (CDM) PO formats, or PRUs of a given PO format 800, 802. In this example, different PO formats may have a different number of instances of POs that can be multiplexed (e.g., based on payload size). For example, PRUs with same PO format can be multiplexed in code domain. As depicted, for example, PRUs of PO format 1 can be CDM'd PRUs 800 and/or PRUs of PO format 4 can be CDM'd PRUs 802. CDM of DMRS can occur on the same or different antenna ports, through scrambling sequence generation and/or different hopping pattern selection. In an example, a UE or other device can perform CDM of PUSCH through bit level scrambling with different initialization seed. CDM'd PRUs can share the same time and frequency resources, in one example.

Figure 9:
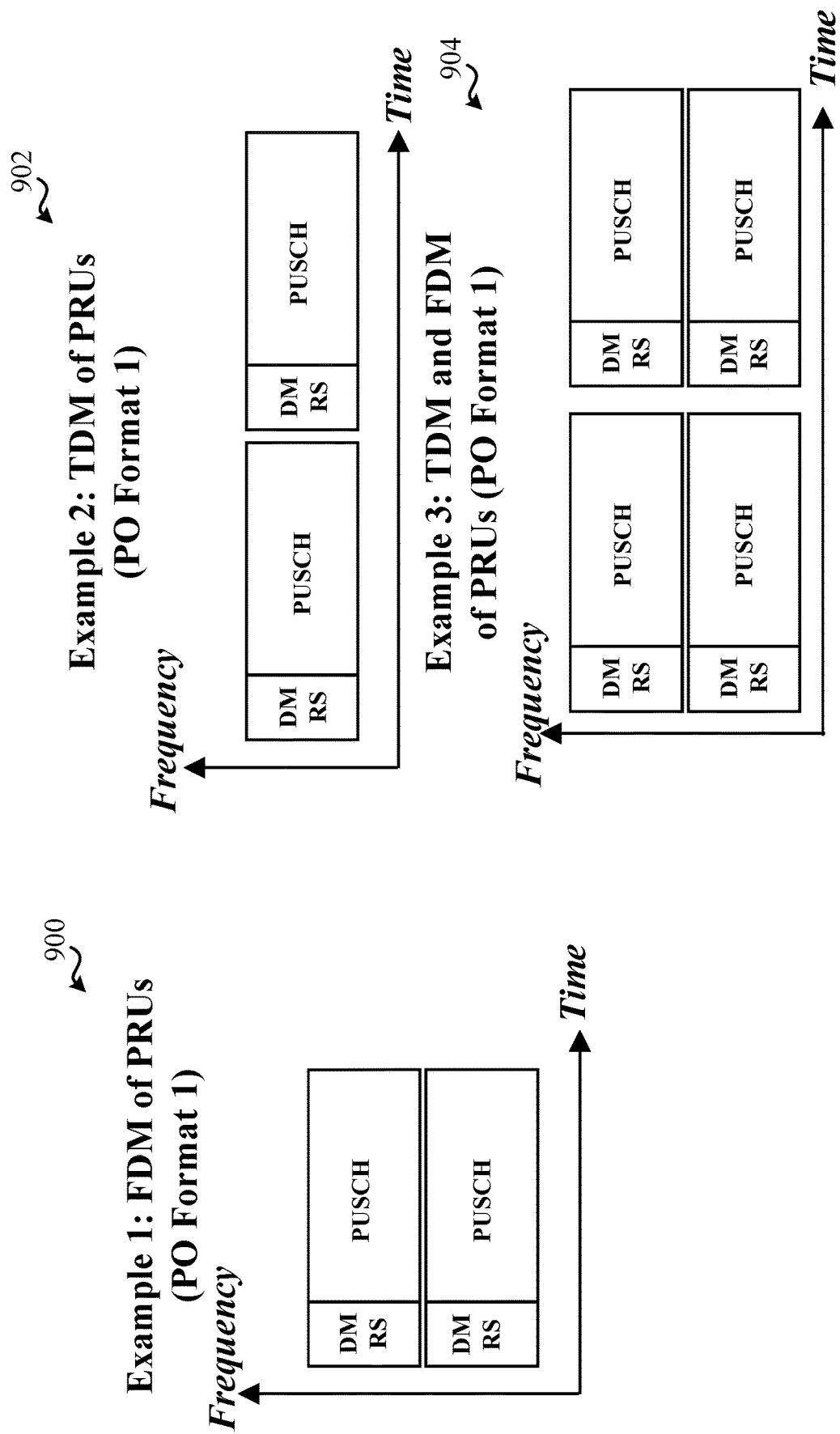
FIG. 9 illustrates examples of time and/or frequency division multiplexed random access message payloads, in accordance with various aspects of the present disclosure.

In another example, the configuration can indicate PO format information, PO resources, etc., so that selected random access preambles and/or payloads transmitted based on the same PO format can be multiplexed in a time and/or frequency domain. An example is shown in FIG. 9, which depicts examples of frequency division multiplexed (FDM) PO formats 900, time division multiplexed (TDM) PO formats 902, and TDM/FDM PO formats 904.

Figure 10:
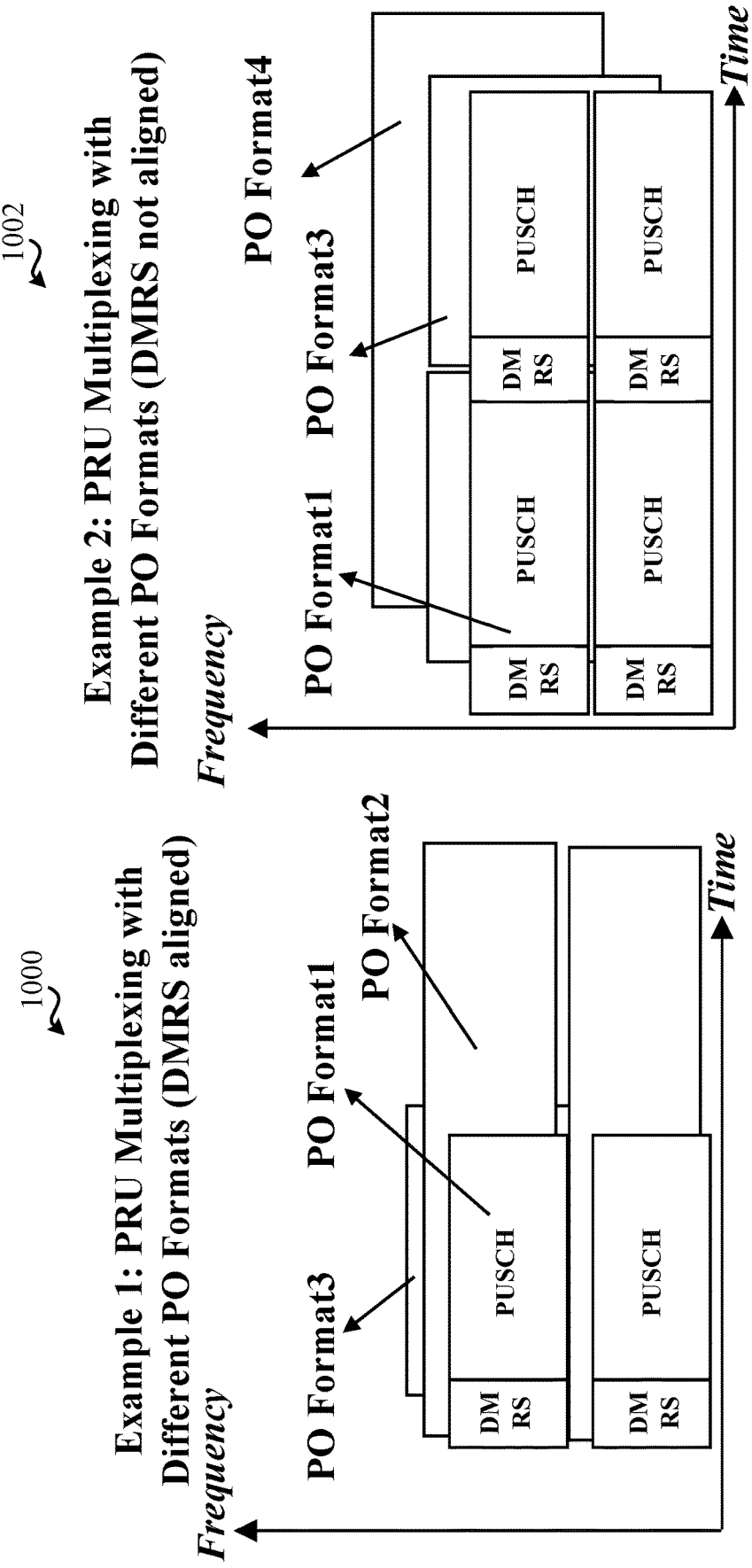
FIG. 10 illustrates an example of multiplexed random access message payloads that are of different payload formats, in accordance with various aspects of the present disclosure.

In another example, the configuration can indicate PO format information, PO resources, etc., so that selected random access preambles and/or payloads transmitted based on different PO formats can be multiplexed in time and frequency domains with the same or different starting symbol locations in time and/or starting PRB locations in frequency. An example is shown in FIG. 10, which depicts an example of multiplexing of different PO formats with DMRS aligned 1000, an example of multiplexing of different PO formats with DMRS not aligned 1002. In any case, in the foregoing examples, the configuration that the UE receives (e.g., as stored in memory and/or received from RRC or other signaling) can indicate resources for PO format, which may or may not include multiplexing on some level.

In method 500, at Block 502, a configuration indicating multiple association rules associating random access preambles and payload formats can be received. In an aspect, scheduling component 342, e.g., in conjunction with processor(s) 312, memory 316, transceiver 302, etc., can receive the configuration indicating multiple association rules associating the random access preambles and payload formats. As described, for example, scheduling component 342 can receive the configuration as stored in memory 316 (e.g., based on a specification) or other storage module, as configured by a backend network component, etc.

In method 500, optionally at Block 504, the configuration can be transmitted. In an aspect, scheduling component 342, e.g., in conjunction with processor(s) 312, memory 316, transceiver 302, etc., can transmit the configuration. For example, scheduling component 342 may transmit the configuration to one or more UEs (e.g., using SI broadcast, RRC message, etc.) to facilitate the UEs using the configuration to select a random access preamble and determine an associated PO format and/or PRU for transmitting an associated payload. In one example, scheduling component 342 may additionally or alternatively generate the configuration and/or portions of the configuration. In one example, scheduling component 342 may determine resource allocations for multiplexing PO formats (e.g., multiplexing the same PO formats using CDM or TDM and/or FDM, as described in FIGS. 8 and 9 above, multiplexing different PO formats, as described in FIG. 10 above, etc.). In any case, the configuration can be generated to specify PRUs that achieve the desired level of multiplexing for the PO formats, and the UEs 104 receiving the configuration can accordingly utilize the PRUs in transmitting payloads to transmit multiplexed payloads, as described herein.

In method 500, at Block 506, a random access preamble, selected from the multiple random access preambles, can be received over a RO, and an associated payload can be received over a corresponding PRU. In an aspect, RA processing component 352, e.g., in conjunction with processor(s) 312, memory 316, transceiver 302, scheduling component 342, etc., can receive, over the RO, the random access preamble, selected from the multiple random access preambles, and, over the corresponding PDU, the associated payload. For example, RA processing component 352 can receive the associated payload based on a PO format associated with the random access preamble. In addition, RA processing component 352 can receive the payload as a number of uplink symbols, including a concatenated DMRS, mapped to resources defined for the PRU, as described.

In this regard, in method 500, at Block 508, at least one of the payload format associated with the random access preamble or the corresponding PRU can be determined based at least in part on at least one of the association rules in the configuration and the selected random access preamble. In an aspect, RA processing component 352, e.g., in conjunction with processor(s) 312, memory 316, transceiver 302, scheduling component 342, etc., can determine, based at least in part on at least one of the association rules in the configuration and the selected random access preamble, at least one of the payload format associated with the selected random access preamble or the corresponding PRU. For example, RA processing component 352 can identify the random access preamble received in the preamble portion of the first message received in the random access procedure, and can look up the received random access preamble (or a corresponding identifier) in the received configuration (e.g., in the LUT or other structure of information). In any case, RA processing component 352 may determine the payload format and/or corresponding PRU based on the received preamble.

In method 500, at Block 510, the associated payload can be processed based on at least one of the payload format or the corresponding PRU for the associated payload. In an aspect, RA processing component 352, e.g., in conjunction with processor(s) 312, memory 316, transceiver 302, scheduling component 342, etc., can process the associated payload based on at least one of the payload format or the corresponding PRU for the associated payload. For example, RA processing component 352 can receive the associated payload over the resources defined for the PO format, PRU, etc., and/or can use one or more parameters of the payload format (e.g., transport block size, MCS, waveform, etc.) to locate the resources for the payload and/or otherwise process the payload.

In processing the payload at Block 510, optionally at Block 512, the associated can be decoded based on a received DMRS. In an aspect, RA processing component 352, e.g., in conjunction with processor(s) 312, memory 316, transceiver 302, scheduling component 342, etc., can process the associated payload based on the received DMRS. For example, RA processing component 352 can detect the DMRS based on the PO format and use the DMRS to demodulate the remainder of the payload (e.g., the PUSCH symbols after the DMRS).

In method 500, optionally at Block 514, a random access response message can be transmitted in response to the random access preamble and/or the payload. In an aspect, response component 354, e.g., in conjunction with processor(s) 312, memory 316, transceiver 302, scheduling component 342, etc., can transmit the random access response message in response to the selected random access preamble and/or the payload. For example, the random access response message may be the second message of the two-step random access procedure and may include a response to the preamble, contention resolution information, and/or the like.

Figure 11:
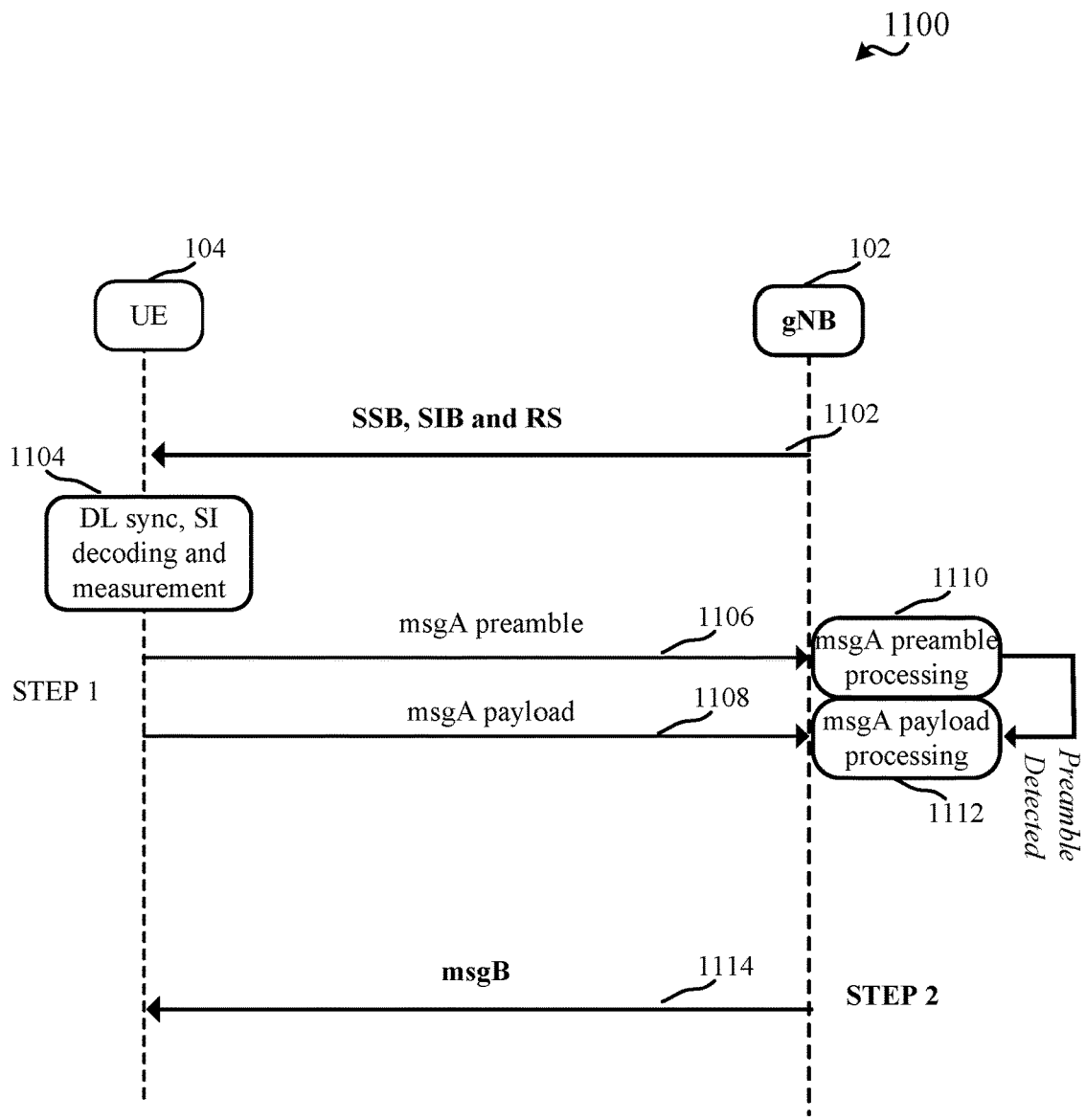
FIG. 11 illustrates an example of a system for transmitting random access messages, in accordance with various aspects of the present disclosure.

FIG. 11 illustrates an example of a system 1100 for transmitting random access messages in a two-step random access procedure. Before starting two-step RACH, UE can receive and processes SSB/SIB/RS from the serving gNB. For example, system 1100 includes a UE 104 that can transmit random access messages to a gNB 102 for requesting connection establishment therewith. In this example, gNB 102 can transmit SSB, SIB, and RS 1102. The UE 104 can perform downlink synchronization, system information decoding and measurements at 1104. Based on the data in UE's 104 buffer, a UE-identifier and the system information, the UE 104 can generate a message A (msgA) and transmit it to gNB on a RO associated with a suitable SSB beam. The UE 104 can transmit msgA as a preamble portion 1106 and a payload portion 1108. After possibly receiving and processing msgA preamble/payload, gNB 102 can generate response message (e.g., msgB), which can be formatted based on the RRC state and use case of msgA, and/or based on a detection status of the msgA (e.g., detection/processing of a preamble portion at 1110 and/or a payload portion at 1112), as described herein. gNB 102 can transmit the msgB to UE 104 at 1114.

Figure 12:
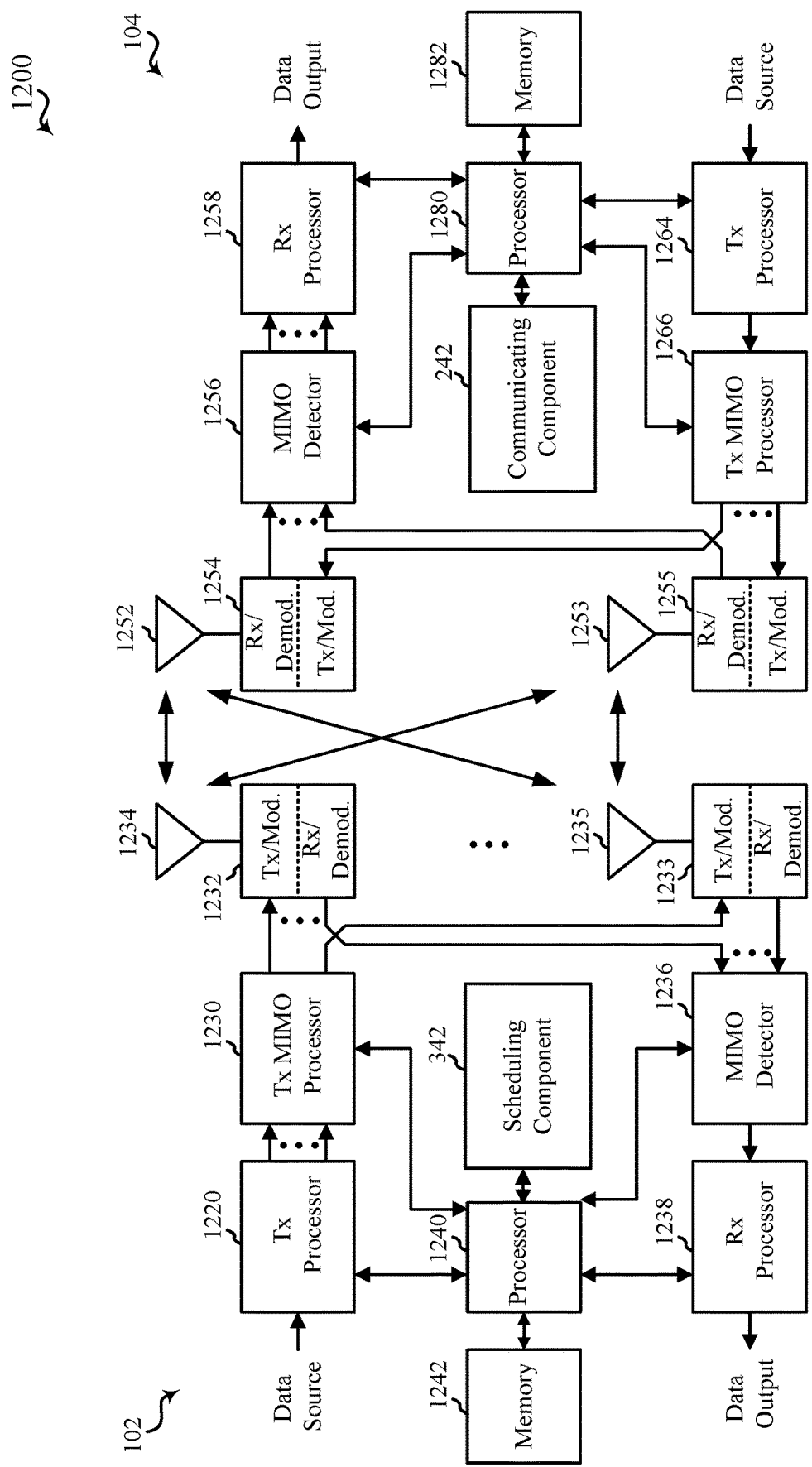
FIG. 12 is a block diagram illustrating an example of a MIMO communication system including a base station and a UE, in accordance with various aspects of the present disclosure.

FIG. 12 is a block diagram of a MIMO communication system 1200 including a base station 102 and a UE 104. The MIMO communication system 1200 may illustrate aspects of the wireless communication access network 100 described with reference to FIG. 1. The base station 102 may be an example of aspects of the base station 102 described with reference to FIG. 1. The base station 102 may be equipped with antennas 1234 and 1235, and the UE 104 may be equipped with antennas 1252 and 1253. In the MIMO communication system 1200, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1220 may receive data from a data source. The transmit processor 1220 may process the data. The transmit processor 1220 may also generate control symbols or reference symbols. A transmit MIMO processor 1230 may perform spatial processing (e.g., precoding) on data symbols, control symbols, or reference symbols, if applicable, and may provide output symbol streams to the transmit modulator/demodulators 1232 and 1233. Each modulator/demodulator 1232 through 1233 may process a respective output symbol stream (e.g., for OFDM, etc.) to obtain an output sample stream. Each modulator/demodulator 1232 through 1233 may further process (e.g., convert to analog, amplify, filter, and upconvert) the output sample stream to obtain a DL signal. In one example, DL signals from modulator/demodulators 1232 and 1233 may be transmitted via the antennas 1234 and 1235, respectively.

The UE 104 may be an example of aspects of the UEs 104 described with reference to FIGS. 1-2. At the UE 104, the UE antennas 1252 and 1253 may receive the DL signals from the base station 102 and may provide the received signals to the modulator/demodulators 1254 and 1255, respectively. Each modulator/demodulator 1254 through 1255 may condition (e.g., filter, amplify, downconvert, and digitize) a respective received signal to obtain input samples. Each modulator/demodulator 1254 through 1255 may further process the input samples (e.g., for OFDM, etc.) to obtain received symbols. A MIMO detector 1256 may obtain received symbols from the modulator/demodulators 1254 and 1255, perform MIMO detection on the received symbols, if applicable, and provide detected symbols. A receive (Rx) processor 1258 may process (e.g., demodulate, deinterleave, and decode) the detected symbols, providing decoded data for the UE 104 to a data output, and provide decoded control information to a processor 1280, or memory 1282.

The processor 1280 may in some cases execute stored instructions to instantiate a communicating component 242 (see e.g., FIGS. 1 and 2).

On the uplink (UL), at the UE 104, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the modulator/demodulators 1254 and 1255 (e.g., for SC-FDMA, etc.), and be transmitted to the base station 102 in accordance with the communication parameters received from the base station 102. At the base station 102, the UL signals from the UE 104 may be received by the antennas 1234 and 1235, processed by the modulator/demodulators 1232 and 1233, detected by a MIMO detector 1236 if applicable, and further processed by a receive processor 1238. The receive processor 1238 may provide decoded data to a data output and to the processor 1240 or memory 1242.

The processor 1240 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1200. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1200.

SOME FURTHER EXAMPLES

In one example, a method for wireless communication includes receiving a configuration indicating multiple association rules associating random access preambles and payload formats, selecting, as part of a random access procedure, a random access preamble from the random access preambles for transmitting over a random access occasion, determining, based at least in part on at least one of the association rules in the configuration, a payload format associated with the random access preamble and a corresponding payload resource unit, and transmitting the random access preamble over the random access occasion and, according to the payload format, an associated payload over the corresponding payload resource unit.

One or more of the above examples can further include wherein the configuration indicates a set of payload sizes, and for each payload size in the set of payload sizes, one or more parameters associated with a corresponding payload format.

One or more of the above examples can further include wherein the one or more parameters include, for the corresponding payload format, one or more of a random access preamble from the random access preambles, a number of symbols or slots of the corresponding payload format, a number of physical resource blocks of the corresponding payload format, a numerology or waveform of an uplink channel, a transport block size, or a modulation and coding scheme.

One or more of the above examples can further include wherein selecting the random access preamble is based at least in part on a buffer status or a radio resource control state.

One or more of the above examples can further include wherein selecting the random access preamble is further based on determining, based on the buffer status or the radio resource control state, that a size associated with the payload format can transmit data in a corresponding buffer.

One or more of the above examples can further include wherein the configuration indicates grouping information for the random access preambles as multiple sets of random access preamble groups based on the payload formats, and wherein selecting the random access preamble comprises selecting, based on the grouping information, the random access preamble from one of the multiple sets of random access preamble groups corresponding to the determined payload format.

One or more of the above examples can further include generating the associated payload as a set of uplink channel symbols based at least in part on the determined payload format.

One or more of the above examples can further include generating a demodulation reference signal (DMRS) sequence for the associated payload, wherein transmitting the associated payload comprises concatenating the DMRS sequence and the set of uplink channel symbols.

One or more of the above examples can further include generating the DMRS sequence is based at least in part on a frame number, a subframe number, or a slot number associated with transmitting the associated payload, a cell identifier, the determined payload format, a sequence index of the random access preamble, or an index of the random access occasion.

One or more of the above examples can further include transmitting the random access preamble and the associated payload comprises determining resources associated with the random access preamble and the corresponding payload resource unit, and transmitting the random access preamble and the associated payload over the determined resources.

One or more of the above examples can further include receiving the configuration in a system information broadcast from a base station, in radio resource control signaling from the base station, or from a memory.

One or more of the above examples can further include wherein the configuration indicates multiplexed resources for payload resource units associated with the random access preambles, including the corresponding payload resource unit associated with the random access preamble.

One or more of the above examples can further include wherein the configuration indicates code division multiplexing for payload resource units corresponding to a set of the random access preambles associated with a same payload format.

One or more of the above examples can further include wherein the configuration indicates at least one of time or frequency division multiplexing for payload resource units corresponding to a set of the random access preambles associated with a same payload format.

One or more of the above examples can further include wherein the configuration indicates at least one of time or frequency division multiplexing for payload resource units corresponding to a set of the random access preambles associated with different payload formats.

In one example, a method for wireless communication includes receiving a configuration indicating multiple association rules associating random access preambles and payload formats, receiving, over a random access occasion, a random access preamble, selected from the random access preambles, and, over a corresponding payload resource unit, an associated payload, determining, based at least in part on at least one of the association rules in the configuration and the random access preamble, a payload format associated with the random access preamble and the corresponding payload resource unit, and processing the associated payload based on at least one of the payload format or the corresponding payload resource unit for the associated payload.

One or more of the above examples can further include wherein the configuration indicates a set of payload sizes, and for each payload size in the set of payload sizes, one or more parameters associated with a corresponding payload format.

One or more of the above examples can further include wherein the one or more parameters include, for the corresponding payload format, one or more of a random access preamble from the random access preambles, a number of symbols or slots of the corresponding payload format, a number of physical resource blocks of the corresponding payload format, a numerology or waveform of an uplink channel, a transport block size, or a modulation and coding scheme.

One or more of the above examples can further include wherein the configuration indicates grouping information for the random access preambles as multiple sets of random access preamble group based on the payload formats.

One or more of the above examples can further include wherein receiving the associated payload comprises receiving a set of uplink channel symbols corresponding to the determined payload format.

One or more of the above examples can further include receiving a demodulation reference signal (DMRS) sequence for the associated payload, wherein receiving the associated payload comprises demodulating the set of uplink channel symbols based on the DMRS sequence.

One or more of the above examples can further include wherein receiving the random access preamble and the associated payload comprises determining resources associated with the random access preamble and the corresponding payload resource unit.

One or more of the above examples can further include transmitting the configuration in a system information broadcast, or in radio resource control signaling.

One or more of the above examples can further include wherein the configuration indicates multiplexed resources for payload resource units associated with the random access preambles, including the corresponding payload resource unit associated with the random access preamble.

One or more of the above examples can further include wherein the configuration indicates code division multiplexing for payload resource units corresponding to a set of the random access preambles associated with a same payload format.

One or more of the above examples can further include wherein the configuration indicates at least one of time or frequency division multiplexing for payload resource units corresponding to a set of the random access preambles associated with a same payload format.

One or more of the above examples can further include wherein the configuration indicates at least one of time or frequency division multiplexing for payload resource units corresponding to a set of the random access preambles associated with different payload formats.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
   receiving a configuration indicating multiple association rules associating random access preambles and physical uplink shared channel (PUSCH) occasion formats;
   selecting, as part of a random access procedure, a random access preamble from the random access preambles for transmitting over a random access occasion;
   determining, based at least in part on at least one of the association rules in the configuration, a PUSCH occasion format associated with the random access preamble and a corresponding payload resource unit; and
   transmitting the random access preamble over the random access occasion and, according to the PUSCH occasion format, an associated payload over the corresponding payload resource unit.

2. The method of example 1, wherein the configuration indicates a set of payload sizes and an indication of resources allocated for payload transmission, and for each payload size in the set of payload sizes, one or more parameters associated with a corresponding PUSCH occasion format and an indication of a starting or ending location of the resources configured for the corresponding PUSCH occasion format.

3. The method of example 2, wherein the one or more parameters include, for the corresponding PUSCH occasion format, one or more of a random access preamble from the random access preambles, a number of symbols or slots of the corresponding PUSCH occasion format, a number of physical resource blocks of the corresponding PUSCH occasion format, a numerology or waveform of an uplink channel, a transport block size, or a modulation and coding scheme.

4. The method of any of examples 1 to 3, wherein selecting the random access preamble is based at least in part on a buffer status or a radio resource control state.

5. The method of example 4, wherein selecting the random access preamble is further based on determining, based on the buffer status or the radio resource control state, that a size associated with the PUSCH occasion format can transmit data in a corresponding buffer.

6. The method of any of examples 1 to 5, wherein the configuration indicates grouping information for the random access preambles as multiple sets of random access preamble groups based on the PUSCH occasion formats, and wherein selecting the random access preamble comprises selecting, based on the grouping information, the random access preamble from one of the multiple sets of random access preamble groups corresponding to the determined PUSCH occasion format.

7. The method of any of examples 1 to 6, further comprising generating the associated payload as a set of uplink channel symbols based at least in part on the determined PUSCH occasion format.

8. The method of example 7, further comprising generating a demodulation reference signal (DMRS) sequence for the associated payload, wherein transmitting the associated payload comprises concatenating the DMRS sequence and the set of uplink channel symbols.

9. The method of example 8, wherein generating the DMRS sequence is based at least in part on a frame number, a subframe number, or a slot number associated with transmitting the associated payload, a cell identifier, the determined PUSCH occasion format, a sequence index of the random access preamble, or an index of the random access occasion.

10. The method of any of examples 1 to 9, wherein transmitting the random access preamble and the associated payload comprises determining at least one of a size or a location of resources associated with the random access preamble and the corresponding payload resource unit, and transmitting the random access preamble and the associated payload over the determined resources.

11. The method of example 10, further comprising receiving the configuration in a system information broadcast from a base station, in radio resource control signaling from the base station, or from a memory.

12. The method of any of examples 10 or 11, wherein the configuration indicates multiplexed resources for payload resource units associated with the random access preambles, including the corresponding payload resource unit associated with the random access preamble.

13. The method of example 12, wherein the configuration indicates code division multiplexing for payload resource units corresponding to a set of the random access preambles associated with a same PUSCH occasion format.

14. The method of any of examples 12 or 13, wherein the configuration indicates at least one of time or frequency division multiplexing schemes for payload resource units corresponding to a set of the random access preambles associated with a same PUSCH occasion format.

15. The method of any of examples 12 to 14, wherein the configuration indicates at least one of time or frequency division multiplexing schemes for payload resource units corresponding to a set of the random access preambles associated with different PUSCH occasion formats.

16. A method for wireless communication, comprising:
receiving a configuration indicating multiple association rules associating random access preambles and physical uplink shared channel (PUSCH) occasion formats;
receiving, over a random access occasion, a random access preamble, selected from the random access preambles, and, over a corresponding payload resource unit, an associated payload;
determining, based at least in part on at least one of the association rules in the configuration and the random access preamble, a PUSCH occasion format associated with the random access preamble and the corresponding payload resource unit; and
processing the associated payload based on at least one of the PUSCH occasion format or the corresponding payload resource unit for the associated payload.

17. The method of example 16, wherein the configuration indicates a set of payload sizes, and for each payload size in the set of payload sizes, one or more parameters associated with a corresponding PUSCH occasion format and an indication of a starting or ending location of resources allocated for the corresponding PUSCH occasion format.

18. The method of example 17, wherein the one or more parameters include, for the corresponding PUSCH occasion format, one or more of a random access preamble from the random access preambles, a number of symbols or slots of the corresponding PUSCH occasion format, a number of physical resource blocks of the corresponding PUSCH occasion format, a numerology or waveform of an uplink channel, a transport block size, or a modulation and coding scheme.

19. The method of any of examples 16 to 18, wherein the configuration indicates grouping information for the random access preambles as multiple sets of random access preamble group based on the PUSCH occasion formats.

20. The method of any of examples 16 to 19, wherein receiving the associated payload comprises receiving a set of uplink channel symbols or slots corresponding to the determined PUSCH occasion format.

21. The method of example 20, further comprising receiving a demodulation reference signal (DMRS) sequence for the associated payload, wherein receiving the associated payload comprises demodulating the set of uplink channel symbols based on the DMRS sequence.

22. The method of any of examples 16 to 21, wherein receiving the random access preamble and the associated payload comprises determining resources associated with the random access preamble and the corresponding payload resource unit.

23. The method of example 22, further comprising transmitting the configuration in a system information broadcast, or in radio resource control signaling.

24. The method of example 23, wherein the configuration indicates multiplexed resources for payload resource units associated with the random access preambles, including the corresponding payload resource unit associated with the random access preamble.

25. The method of example 24, wherein the configuration indicates code division multiplexing for payload resource units corresponding to a set of the random access preambles associated with a same PUSCH occasion format.

26. The method of any of examples 24 or 25, wherein the configuration indicates at least one of time or frequency division multiplexing schemes for payload resource units corresponding to a set of the random access preambles associated with a same PUSCH occasion format.

27. The method of any of examples 24 to 26, wherein the configuration indicates at least one of time or frequency division multiplexing schemes for payload resource units corresponding to a set of the random access preambles associated with different PUSCH occasion formats.

28. An apparatus for wireless communication, comprising:
a transceiver;
a memory configured to store instructions; and
one or more processors coupled with the transceiver and the memory, wherein the instructions are executable by the one or more processors to perform the operations of one or more methods in any of examples 1 to 27.

29. An apparatus for wireless communication, comprising means for performing the operations of one or more methods in any of examples 1 to 27.

30. A computer-readable medium, comprising code executable by one or more processors to perform the operations of one or more methods in any of examples 1 to 27.

What is claimed is:

1. A method for wireless communication, comprising:
receiving a configuration indicating multiple association rules associating random access preambles and physical uplink shared channel (PUSCH) occasion formats, wherein each PUSCH occasion format of the PUSCH occasion formats is based on a corresponding one of multiple configured subcarrier spacings;
selecting, as part of a random access procedure, a random access preamble from the random access preambles for transmitting over a random access occasion;
determining, based at least in part on at least one of the multiple association rules indicated by the configuration, a PUSCH occasion format associated with the random access preamble and a corresponding payload resource unit; and
transmitting the random access preamble over the random access occasion and, according to the PUSCH occasion format, an associated payload over the corresponding payload resource unit.

2. The method of claim 1, wherein the configuration indicates a set of payload sizes and an indication of resources allocated for payload transmission, and for each payload size in the set of payload sizes, one or more parameters associated with a corresponding PUSCH occasion format and an indication of a starting or ending location of the resources configured for the corresponding PUSCH occasion format.

3. The method of claim 2, wherein the one or more parameters include, for the corresponding PUSCH occasion format, one or more of a random access preamble from the random access preambles, a number of symbols or slots of the corresponding PUSCH occasion format, a number of physical resource blocks of the corresponding PUSCH occasion format, a numerology or waveform of an uplink channel, a transport block size, or a modulation and coding scheme.

4. The method of claim 1, wherein selecting the random access preamble is based at least in part on a buffer status or a radio resource control state.

5. The method of claim 4, wherein selecting the random access preamble is further based on determining, based on the buffer status or the radio resource control state, that a size associated with the PUSCH occasion format can transmit data in a corresponding buffer.

6. The method of claim 1, wherein the configuration indicates grouping information for the random access preambles as multiple sets of random access preamble groups based on the PUSCH occasion formats, and wherein selecting the random access preamble comprises selecting, based on the grouping information, the random access preamble from one of the multiple sets of random access preamble groups corresponding to the determined PUSCH occasion format.

7. The method of claim 1, further comprising generating the associated payload as a set of uplink channel symbols based at least in part on the determined PUSCH occasion format.

8. The method of claim 7, further comprising generating a demodulation reference signal (DMRS) sequence for the associated payload, wherein transmitting the associated payload comprises concatenating the DMRS sequence and the set of uplink channel symbols.

9. The method of claim 8, wherein generating the DMRS sequence is based at least in part on a slot number associated with transmitting the associated payload.

10. The method of claim 1, wherein transmitting the random access preamble and the associated payload comprises determining at least one of a size or a location of resources associated with the random access preamble and the corresponding payload resource unit, and transmitting the random access preamble and the associated payload over the resources.

11. The method of claim 10, further comprising receiving the configuration in a system information broadcast from a base station, in radio resource control signaling from the base station, or from a memory.

12. The method of claim 10, wherein the configuration indicates multiplexed resources for payload resource units associated with the random access preambles, including the corresponding payload resource unit associated with the random access preamble.

13. The method of claim 12, wherein the configuration indicates code division multiplexing for payload resource units corresponding to a set of the random access preambles associated with a same PUSCH occasion format.

14. The method of claim 12, wherein the configuration indicates at least one of time or frequency division multiplexing schemes for payload resource units corresponding to a set of the random access preambles associated with a same PUSCH occasion format.

15. The method of claim 12, wherein the configuration indicates at least one of time or frequency division multiplexing schemes for payload resource units corresponding to a set of the random access preambles associated with different PUSCH occasion formats.

16. A method for wireless communication, comprising:
receiving a configuration indicating multiple association rules associating random access preambles and physical uplink shared channel (PUSCH) occasion formats, wherein each PUSCH occasion format of the PUSCH occasion formats is based on a corresponding one of multiple configured subcarrier spacings;
receiving, over a random access occasion, a random access preamble, selected from the random access preambles, and, over a corresponding payload resource unit, an associated payload;
determining, based at least in part on at least one of the multiple association rules indicated by the configuration and the random access preamble, a PUSCH occasion format associated with the random access preamble and the corresponding payload resource unit; and
processing the associated payload based on at least one of the PUSCH occasion format or the corresponding payload resource unit for the associated payload.

17. The method of claim 16, wherein the configuration indicates a set of payload sizes, and for each payload size in the set of payload sizes, one or more parameters associated with a corresponding PUSCH occasion format and an indication of a starting or ending location of resources allocated for the corresponding PUSCH occasion format.

18. The method of claim 17, wherein the one or more parameters include, for the corresponding PUSCH occasion format, one or more of a random access preamble from the random access preambles, a number of symbols or slots of the corresponding PUSCH occasion format, a number of physical resource blocks of the corresponding PUSCH occasion format, a numerology or waveform of an uplink channel, a transport block size, or a modulation and coding scheme.

19. The method of claim 16, wherein the configuration indicates grouping information for the random access preambles as multiple sets of random access preamble group based on the PUSCH occasion formats.

20. The method of claim 16, wherein receiving the associated payload comprises receiving a set of uplink channel symbols or slots corresponding to the determined PUSCH occasion format.

21. The method of claim 20, further comprising receiving a demodulation reference signal (DMRS) sequence for the associated payload, wherein receiving the associated payload comprises demodulating the set of uplink channel symbols based on the DMRS sequence.

22. The method of claim 16, wherein receiving the random access preamble and the associated payload comprises determining resources associated with the random access preamble and the corresponding payload resource unit.

23. The method of claim 22, further comprising transmitting the configuration in a system information broadcast, or in radio resource control signaling.

24. The method of claim 23, wherein the configuration indicates multiplexed resources for payload resource units associated with the random access preambles, including the corresponding payload resource unit associated with the random access preamble.

25. The method of claim 24, wherein the configuration indicates code division multiplexing for payload resource units corresponding to a set of the random access preambles associated with a same PUSCH occasion format.

26. The method of claim 24, wherein the configuration indicates at least one of time or frequency division multiplexing schemes for payload resource units corresponding to a set of the random access preambles associated with a same PUSCH occasion format.

27. The method of claim 24, wherein the configuration indicates at least one of time or frequency division multiplexing schemes for payload resource units corresponding to a set of the random access preambles associated with different PUSCH occasion formats.

28. An apparatus for wireless communication, comprising:
a transceiver;
a memory configured to store instructions; and
one or more processors coupled with the transceiver and the memory, wherein the instructions are executable by the one or more processors to cause the apparatus to:
receive a configuration indicating multiple association rules associating random access preambles and physical uplink shared channel (PUSCH) occasion formats, wherein each PUSCH occasion format of the PUSCH occasion formats is based on a corresponding one of multiple configured subcarrier spacings;
select, as part of a random access procedure, a random access preamble from the random access preambles for transmitting over a random access occasion;
determine, based at least in part on at least one of the multiple association rules indicated by the configuration, a PUSCH occasion format associated with the random access preamble and a corresponding payload resource unit; and
transmit the random access preamble over the random access occasion and, according to the PUSCH occasion format, an associated payload over the corresponding payload resource unit.

29. The apparatus of claim 28, wherein the configuration indicates a set of payload sizes and an indication of resources allocated for payload transmission, and for each payload size in the set of payload sizes, one or more parameters associated with a corresponding PUSCH occasion format and an indication of a starting or ending location of the resources configured for the corresponding PUSCH occasion format.

30. The apparatus of claim 29, wherein the one or more parameters include, for the corresponding PUSCH occasion format, one or more of a random access preamble from the random access preambles, a number of symbols or slots of the corresponding PUSCH occasion format, a number of physical resource blocks of the corresponding PUSCH occasion format, a numerology or waveform of an uplink channel, a transport block size, or a modulation and coding scheme.

31. The apparatus of claim 28, wherein the instructions are further executable by the one or more processors to cause the apparatus to select the random access preamble based at least in part on a buffer status or a radio resource control state.

32. The apparatus of claim 31, wherein the instructions are further executable by the one or more processors to cause the apparatus to select the random access preamble further based on determining, based on the buffer status or the radio resource control state, that a size associated with the PUSCH occasion format can transmit data in a corresponding buffer.

33. The apparatus of claim 28, wherein the configuration indicates grouping information for the random access preambles as multiple sets of random access preamble groups based on the PUSCH occasion formats, and wherein the instructions are further executable by the one or more processors to cause the apparatus to select, based on the grouping information, the random access preamble from one of the multiple sets of random access preamble groups corresponding to the determined PUSCH occasion format.

34. The apparatus of claim 28, wherein the instructions are further executable by the one or more processors to cause the apparatus to generate the associated payload as a set of uplink channel symbols based at least in part on the determined PUSCH occasion format.

35. The apparatus of claim 34, wherein the instructions are further executable by the one or more processors to cause the apparatus to generate a demodulation reference signal (DMRS) sequence for the associated payload, wherein the instructions are further executable by the one or more processors to cause the apparatus to transmit the associated payload at least in part by concatenating the DMRS sequence and the set of uplink channel symbols.

36. The apparatus of claim 35, wherein the instructions are further executable by the one or more processors to cause the apparatus to generate the DMRS sequence based at least in part on a slot number associated with transmitting the associated payload.

37. The apparatus of claim 28, wherein the instructions are further executable by the one or more processors to cause the apparatus to transmit the random access preamble and the associated payload at least in part by determining at least one of a size or a location of resources associated with the random access preamble and the corresponding payload resource unit, and transmitting the random access preamble and the associated payload over the resources.

38. The apparatus of claim 37, wherein the instructions are further executable by the one or more processors to cause the apparatus to receive the configuration in a system information broadcast from a base station, in radio resource control signaling from the base station, or from a memory.

39. The apparatus of claim 37, wherein the configuration indicates multiplexed resources for payload resource units associated with the random access preambles, including the corresponding payload resource unit associated with the random access preamble.

40. The apparatus of claim 39, wherein the configuration indicates code division multiplexing for payload resource units corresponding to a set of the random access preambles associated with a same PUSCH occasion format.

41. The apparatus of claim 39, wherein the configuration indicates at least one of time or frequency division multiplexing schemes for payload resource units corresponding to a set of the random access preambles associated with a same PUSCH occasion format.

42. The apparatus of claim 39, wherein the configuration indicates at least one of time or frequency division multiplexing schemes for payload resource units corresponding to a set of the random access preambles associated with different PUSCH occasion formats.

43. An apparatus for wireless communication, comprising:
a transceiver;
a memory configured to store instructions; and
one or more processors coupled with the transceiver and the memory, wherein the instructions are executable by the one or more processors to cause the apparatus to:
receive a configuration indicating multiple association rules associating random access preambles and physical uplink shared channel (PUSCH) occasion formats, wherein each PUSCH occasion format of the PUSCH occasion formats is based on a corresponding one of multiple configured subcarrier spacings;
receive, over a random access occasion, a random access preamble, selected from the random access preambles, and, over a corresponding payload resource unit, an associated payload;

determine, based at least in part on at least one of the multiple association rules indicated by the configuration and the random access preamble, a PUSCH occasion format associated with the random access preamble and the corresponding payload resource unit; and process the associated payload based on at least one of the PUSCH occasion format or the corresponding payload resource unit for the associated payload.

44. The apparatus of claim 43, wherein the configuration indicates a set of payload sizes, and for each payload size in the set of payload sizes, one or more parameters associated with a corresponding PUSCH occasion format and an indication of a starting or ending location of resources allocated for the corresponding PUSCH occasion format.

45. The apparatus of claim 44, wherein the one or more parameters include, for the corresponding PUSCH occasion format, one or more of a random access preamble from the random access preambles, a number of symbols or slots of the corresponding PUSCH occasion format, a number of physical resource blocks of the corresponding PUSCH occasion format, a numerology or waveform of an uplink channel, a transport block size, or a modulation and coding scheme.

46. The apparatus of claim 43, wherein the configuration indicates grouping information for the random access preambles as multiple sets of random access preamble group based on the PUSCH occasion formats.

47. The apparatus of claim 43, wherein the instructions are further executable by the one or more processors to cause the apparatus to receive the associated payload at least in part by receiving a set of uplink channel symbols or slots corresponding to the determined PUSCH occasion format.

48. The apparatus of claim 47, wherein the instructions are further executable by the one or more processors to cause the apparatus to receive a demodulation reference signal (DMRS) sequence for the associated payload, wherein the instructions are further executable by the one or more processors to cause the apparatus to receive the associated payload at least in part by demodulating the set of uplink channel symbols based on the DMRS sequence.

49. The apparatus of claim 43, wherein the instructions are further executable by the one or more processors to cause the apparatus to receive the random access preamble and the associated payload at least in part by determining resources associated with the random access preamble and the corresponding payload resource unit.

50. The apparatus of claim 49, wherein the instructions are further executable by the one or more processors to cause the apparatus to transmit the configuration in a system information broadcast, or in radio resource control signaling.

51. The apparatus of claim 50, wherein the configuration indicates multiplexed resources for payload resource units associated with the random access preambles, including the corresponding payload resource unit associated with the random access preamble.

52. The apparatus of claim 51, wherein the configuration indicates code division multiplexing for payload resource units corresponding to a set of the random access preambles associated with a same PUSCH occasion format.

53. The apparatus of claim 51, wherein the configuration indicates at least one of time or frequency division multiplexing schemes for payload resource units corresponding to a set of the random access preambles associated with a same PUSCH occasion format.

54. The apparatus of claim 51, wherein the configuration indicates at least one of time or frequency division multiplexing schemes for payload resource units corresponding to a set of the random access preambles associated with different PUSCH occasion formats.

55. An apparatus for wireless communication, comprising:

means for receiving a configuration indicating multiple association rules associating random access preambles and physical uplink shared channel (PUSCH) occasion formats, wherein each PUSCH occasion format of the PUSCH occasion formats is based on a corresponding one of multiple configured subcarrier spacings;

means for selecting, as part of a random access procedure, a random access preamble from the random access preambles for transmitting over a random access occasion;

means for determining, based at least in part on at least one of the multiple association rules indicated by the configuration, a PUSCH occasion format associated with the random access preamble and a corresponding payload resource unit; and means for transmitting the random access preamble over the random access occasion and, according to the PUSCH occasion format, an associated payload over the corresponding payload resource unit.

56. The apparatus of claim 55, wherein the configuration indicates a set of payload sizes and an indication of resources allocated for payload transmission, and for each payload size in the set of payload sizes, one or more parameters associated with a corresponding PUSCH occasion format and an indication of a starting or ending location of the resources configured for the corresponding PUSCH occasion format.

57. An apparatus for wireless communication, comprising:

means for receiving a configuration indicating multiple association rules associating random access preambles and physical uplink shared channel (PUSCH) occasion formats, wherein each PUSCH occasion format of the PUSCH occasion formats is based on a corresponding one of multiple configured subcarrier spacings;

means for receiving, over a random access occasion, a random access preamble, selected from the random access preambles, and, over a corresponding payload resource unit, an associated payload;

means for determining, based at least in part on at least one of the multiple association rules indicated by the configuration and the random access preamble, a PUSCH occasion format associated with the random access preamble and the corresponding payload resource unit; and means for processing the associated payload based on at least one of the PUSCH occasion format or the corresponding payload resource unit for the associated payload.

58. The apparatus of claim 57, wherein the configuration indicates a set of payload sizes, and for each payload size in the set of payload sizes, one or more parameters associated with a corresponding PUSCH occasion format and an indication of a starting or ending location of resources allocated for the corresponding PUSCH occasion format.

59. A non-transitory computer-readable medium, comprising code executable by one or more processors for wireless communications, the code comprising code for:

receiving a configuration indicating multiple association rules associating random access preambles and physical uplink shared channel (PUSCH) occasion formats, wherein each PUSCH occasion format of the PUSCH occasion formats is based on a corresponding one of multiple configured subcarrier spacings;

selecting, as part of a random access procedure, a random access preamble from the random access preambles for transmitting over a random access occasion;

determining, based at least in part on at least one of the multiple association rules indicated by the configuration, a PUSCH occasion format associated with the random access preamble and a corresponding payload resource unit; and transmitting the random access preamble over the random access occasion and, according to the PUSCH occasion format, an associated payload over the corresponding payload resource unit.

60. The non-transitory computer-readable medium of claim 59, wherein the configuration indicates a set of payload sizes and an indication of resources allocated for payload transmission, and for each payload size in the set of payload sizes, one or more parameters associated with a corresponding PUSCH occasion format and an indication of a starting or ending location of the resources configured for the corresponding PUSCH occasion format.

61. A non-transitory computer-readable medium, comprising code executable by one or more processors for wireless communications, the code comprising code for:

receiving a configuration indicating multiple association rules associating random access preambles and physical uplink shared channel (PUSCH) occasion formats, wherein each PUSCH occasion format of the PUSCH occasion formats is based on a corresponding one of multiple configured subcarrier spacings;

receiving, over a random access occasion, a random access preamble, selected from the random access preambles, and, over a corresponding payload resource unit, an associated payload;

determining, based at least in part on at least one of the multiple association rules indicated by the configuration and the random access preamble, a PUSCH occasion format associated with the random access preamble and the corresponding payload resource unit; and processing the associated payload based on at least one of the PUSCH occasion format or the corresponding payload resource unit for the associated payload.

62. The non-transitory computer-readable medium of claim 61, wherein the configuration indicates a set of payload sizes, and for each payload size in the set of payload sizes, one or more parameters associated with a corresponding PUSCH occasion format and an indication of a starting or ending location of resources allocated for the corresponding PUSCH occasion format.

* * * * *